(12) United States Patent
McKinney et al.

(10) Patent No.: US 8,597,379 B2
(45) Date of Patent: Dec. 3, 2013

(54) METHOD OF SELECTIVELY HEAT SEALING SEPARATORS FOR NICKEL ZINC CELLS

(75) Inventors: Bryan L. McKinney, San Diego, CA (US); Steve Salamon, Poway, CA (US); James Wu, Olmsted Township, OH (US); Todd F. Tatar, Bonita, CA (US); Brian M. Schroeter, San Diego, CA (US); Jeffrey Phillips, La Jolla, CA (US)

(73) Assignee: PowerGenix Systems, Inc., La Jolla, CA (US)

( * ) Notice: Subject to any disclaimer, the term of this patent is extended or adjusted under 35 U.S.C. 154(b) by 0 days.

(21) Appl. No.: 13/548,932

(22) Filed: Jul. 13, 2012

(65) Prior Publication Data

US 2012/0279056 A1 Nov. 8, 2012

Related U.S. Application Data

(62) Division of application No. 12/877,841, filed on Sep. 8, 2010, now abandoned.

(60) Provisional application No. 61/240,600, filed on Sep. 8, 2009.

(51) Int. Cl.
*H01M 6/02* (2006.01)
*H01M 6/00* (2006.01)
*H01M 2/14* (2006.01)
*H01M 2/16* (2006.01)

(52) U.S. Cl.
USPC ........ 29/623.2; 29/623.3; 29/623.4; 429/129; 429/131; 429/135; 429/185

(58) Field of Classification Search
None
See application file for complete search history.

(56) References Cited

U.S. PATENT DOCUMENTS

| | | |
|---|---|---|
| 3,013,100 A | 12/1961 | Solomon et al. |
| 5,215,836 A | 6/1993 | Eisenberg |
| 5,741,608 A | 4/1998 | Kojima et al. |
| 6,797,433 B2 | 9/2004 | Phillips |
| 6,811,926 B2 | 11/2004 | Phillips |
| 6,818,350 B2 | 11/2004 | Phillips |
| 6,835,499 B2 | 12/2004 | Phillips |
| 6,951,576 B1 | 10/2005 | Takeuchi |
| 7,550,230 B2 | 6/2009 | Phillips et al. |

(Continued)

FOREIGN PATENT DOCUMENTS

| | | |
|---|---|---|
| EP | 1601034 | 11/2005 |
| EP | 1742279 | 1/2010 |

(Continued)

OTHER PUBLICATIONS

PCT International Search Report and Written Opinion dated Nov. 11, 2010 issued in Application No. PCT/US2010/048154.

(Continued)

*Primary Examiner* — Kwang Han
(74) *Attorney, Agent, or Firm* — Weaver Austin Villeneuve & Sampson LLP

(57) ABSTRACT

Embodiments are described in terms of selective methods of sealing separators and jellyroll electrode assemblies and cells made using such methods. More particularly, methods of selectively heat sealing separators to encapsulate one of two electrodes for nickel-zinc rechargeable cells having jellyroll assemblies are described. Selective heat sealing may be applied to both ends of a jellyroll electrode assembly in order to selectively seal one of two electrodes on each end of the jellyroll.

13 Claims, 17 Drawing Sheets

(56) References Cited

U.S. PATENT DOCUMENTS

| | | |
|---|---|---|
| 2002/0182501 A1 | 12/2002 | Phillips |
| 2003/0017385 A1 | 1/2003 | Frustaci |
| 2006/0207084 A1 | 9/2006 | Phillips |
| 2006/0240317 A1 | 10/2006 | Phillips et al. |
| 2010/0062342 A1 | 3/2010 | Li |
| 2010/0062347 A1 | 3/2010 | Li |
| 2010/0291439 A1 | 11/2010 | Phillips et al. |
| 2011/0033747 A1 | 2/2011 | Phillips et al. |

FOREIGN PATENT DOCUMENTS

| | | |
|---|---|---|
| WO | WO 02/039517 | 5/2002 |
| WO | WO 02/39520 | 5/2002 |
| WO | WO 02/39521 | 5/2002 |
| WO | WO 02/39534 | 5/2002 |
| WO | WO 02/075830 | 9/2002 |
| WO | WO 2005/020353 | 3/2005 |
| WO | WO 2006/116496 | 11/2006 |
| WO | WO 2011/031778 | 3/2011 |

OTHER PUBLICATIONS

E-mail entitled "Respecting Hydrology Science in the Patenting System" dated Mar. 10, 2011 from Elson Silva (6 pp.).

U.S. Appl. No. 13,549,322, filed Jul. 13, 2012 entitled "Heat Sealing Separators for Nickel Zinc Cells".

US Office Action dated Sep. 29, 2011 issued in U.S. Appl. No. 12/877,841.

US Final Office Action dated Mar. 16, 2012 issued in U.S. Appl. No. 12/877,841.

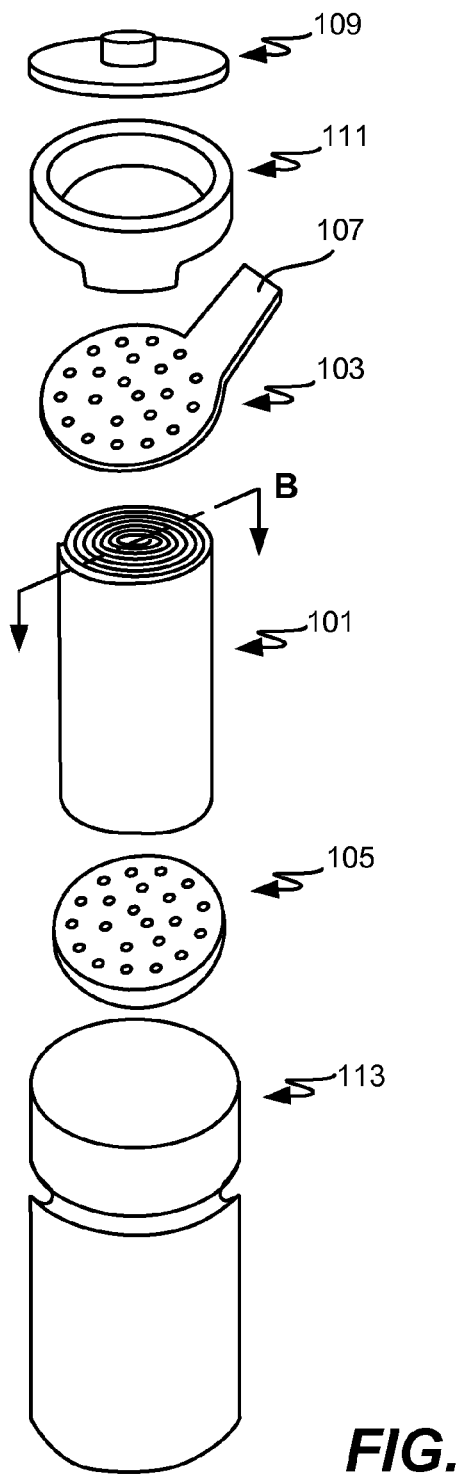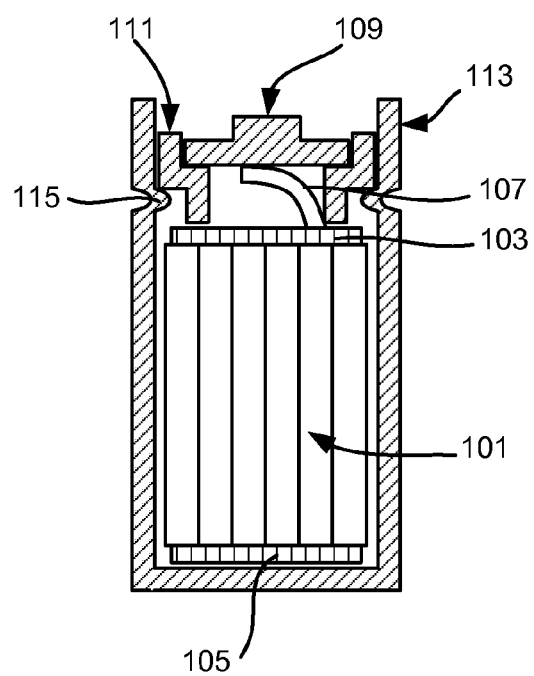
FIG. 1B
FIG. 1A

METHOD OF SELECTIVELY HEAT SEALING SEPARATORS FOR NICKEL ZINC CELLS

CROSS-REFERENCE TO RELATED APPLICATIONS

This application is a divisional application of U.S. application Ser. No. 12/877,841 filed Sep. 8, 2010, which claims the benefit of and priority to U.S. Provisional Application Ser. No. 61/240,600 filed Sep. 8, 2009, the contents of which are incorporated herein by reference in their entirety and for all purposes.

BACKGROUND

This invention pertains generally to rechargeable batteries and specifically to rechargeable nickel-zinc batteries. More specifically, this invention pertains electrode assemblies used in rechargeable nickel-zinc batteries and methods of manufacture.

The popularity of cordless portable devices, such as power tools, has increased the needs and requirements for high energy density rechargeable batteries that can also deliver high power. As power and energy density requirements increase, the need for a high cycle life rechargeable electrodes also increases. The alkaline zinc electrode is known for its high voltage, low equivalent weight and low cost. The fast electrochemical kinetics associated with the charge and discharge process enables the zinc electrode to deliver both high power and high energy density. Nickel-zinc batteries can satisfy the need for higher power and higher energy density in e.g. batteries, suitable for electric vehicles (EV), plug-in hybrid electric vehicles (PHEV), consumer electronics and other applications.

Particularly important is life cycle of rechargeable batteries. Nickel-zinc batteries can suffer from electrical shorts due to, e.g., dendrite formation from the negative (zinc) electrode to the positive (nickel) electrode. Previous approaches to this problem include, e.g., chemical modification of the electrodes to reduce the propensity toward shorting, but these are not typically optimal chemistries for high rate discharge and battery capacity. Coating or taping edges of electrodes is difficult to implement on a production scale and typically are not highly effective.

Separators are typically used to block dendrites from creating shorts between the electrodes but dendrites can migrate around separators unless they are sealed to envelop the electrodes. Sealing separators to envelop individual electrodes effectively blocks dendrite growth (or other particle migration) between electrodes, which extends battery life. In prismatic cells individual electrodes are enveloped prior to assembly of the electrode stack.

In wound electrodes, enveloping individual electrodes prior to winding is problematic due to wrinkling, binding and other difficulties attributable to the physical characteristics of the separator materials and the fact that many layers are wound together in the jellyroll. Heat sealing separators post-winding is known, but such methods only address sealing both electrodes on one end of a wound jellyroll electrode assembly. These methods do not allow for flexibility in internal cell design which is often critical in ever changing uses for rechargeable nickel zinc cells.

SUMMARY

The invention is most generally described in terms of selective methods of sealing separators and jellyroll electrode assemblies made using such methods. More particularly the invention is described in terms of methods of selectively heat sealing separators on one of two electrodes for nickel-zinc rechargeable cells having jellyroll assemblies. Selective sealing can be employed on one or both ends of a jellyroll assembly.

Thus, one aspect of the invention is a method of selectively sealing a first set of separator layers disposed on both sides of and extending past an edge of a first electrode of a jellyroll assembly including two electrodes, while not sealing a second set of separator layers disposed on both sides of and extending past an edge, parallel and proximate to the edge of the first electrode, of a second electrode, both edges disposed on the same end of the jellyroll assembly, while exposing the same end of the jellyroll assembly to a heat source. This method can be accomplished in a number of ways in accord with the embodiments described herein.

In one embodiment, selectively sealing the first set of separator layers includes: i) configuring the current collecting substrate of the second electrode so that when the heat source is applied to the same end of the jellyroll assembly, the first set of separator layers can seal to envelop the first electrode, but the second set of separator layers are physically obstructed from sealing and enveloping the second electrode; and ii) applying the heat source to the same end of the jellyroll assembly. In a specific embodiment, configuring the current collecting substrate of the second electrode includes folding the current collecting substrate of the second electrode substantially over, but not touching, the current collecting substrate of the first electrode, so that a substantially enclosed volume is formed, where the first set of separator layers and adjoining separator layers from the second set of separator layers are disposed in the substantially enclosed volume.

In another embodiment, selectively sealing the first set of separator layers includes: i) configuring the jellyroll assembly such that the first set of separator layers includes layers that can seal to envelop the first electrode when the heat source is applied, but the second set of separator layers includes layers that can not seal to envelop the second electrode when the heat source is applied; and ii) applying the heat source to the same end of the jellyroll assembly.

In one embodiment, as applied to the embodiments described above, the first set of separator layers and the second set of separator layers each have different melting points. In another embodiment, as applied to the embodiments above, the first set of separator layers are polypropylene layers and the second set of separator layers are cellulose-based layers. In one embodiment, the cellulose-based layers are cellulose impregnated and/or coated with polyvinyl alcohol (PVA).

In one embodiment, the heat source includes at least one of a convective heat source, an inductive heat source, a conductive heat source and a radiative heat source. In another embodiment the heat source is a conductive heat source. In another embodiment the conductive heat source is a heated platen. In one embodiment, the end of the jellyroll that is heated, where the first electrode is selectively enveloped via sealing the first set of separators, is contacted with the heated platen for between about 1 second and about 30 seconds, where the platen temperature is between about 130° C. and 600° C. In another embodiment, the jellyroll is contacted with the heated platen for between about 3 seconds and about 10 seconds, where the platen temperature is between about 300° C. and 600° C. In yet another embodiment, the jellyroll is contacted with the heated platen for between about 5 seconds and about 25 seconds, where the platen temperature is between about 450° C. and 550° C.

In some embodiments, during contact with the heated platen, the jellyroll is contacted with the heated platen with a force of between about 0.5 kg/cm² and about 5 kg/cm². In other embodiments, the jellyroll is contacted with the heated platen with a force of between about 1 kg/cm² and about 3 kg/cm². In other embodiments, the jellyroll is contacted with the heated platen with a force of between about 1 kg/cm² and about 2 kg/cm². In other embodiments, the jellyroll is contacted with the heated platen with a force of about 1.5 kg/cm².

Methods of the invention can be practiced with any jellyroll configured electrode assembly, and is particularly useful for nickel zinc cells where dendrite formation from the zinc electrode can short the electrodes.

Thus, another aspect of the invention is a jellyroll electrode assembly including: i) a first electrode disposed between a first set of separator layers; and ii) a second electrode disposed between a second set of separator layers; where, at the same end of the jellyroll electrode assembly, one of the first electrode and the second electrode is enveloped by its respective set of separator layers and the other electrode is not enveloped by its set of separator layers. In one embodiment, the first electrode is a zinc electrode and the second electrode is a nickel electrode. In another embodiment, the first set of separator layers includes polypropylene layers. In another embodiment, the second set of separator layers includes polyvinyl alcohol impregnated cellulose. Batteries which include the jellyroll electrode assemblies described herein are another aspect of the invention.

These and other features and advantages are further discussed below with reference to the associated drawings.

BRIEF DESCRIPTION OF THE DRAWINGS

FIGS. 1A, 1B and 1C are graphical representations of the main components of cylindrical nickel zinc power cells of the invention.

DETAILED DESCRIPTION

A. Definitions

Figure 1C:
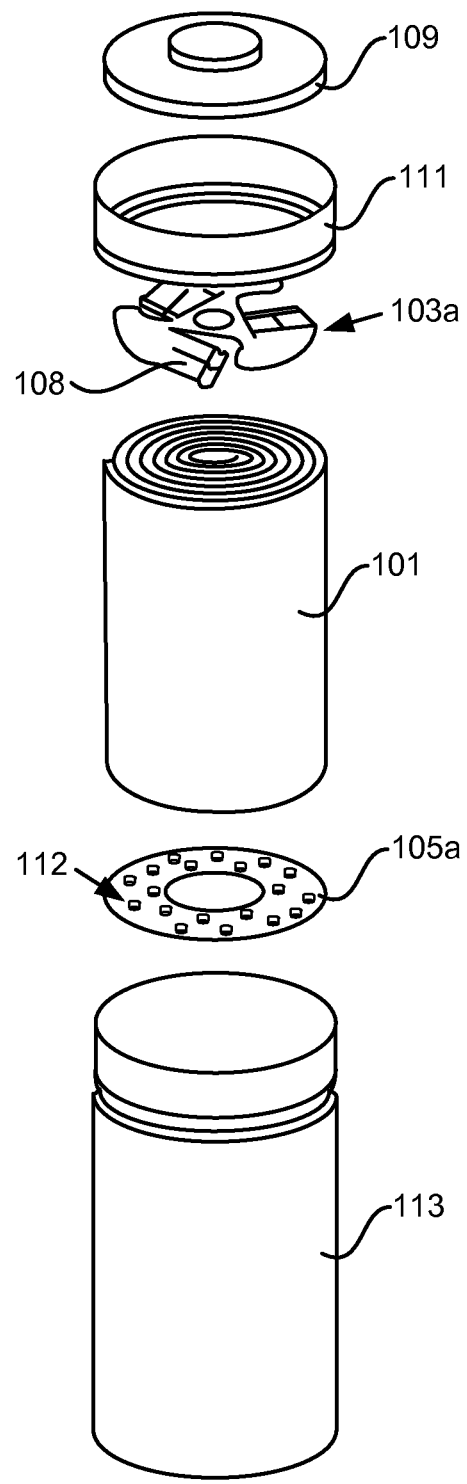

Some of the terms used herein are not commonly used in the art. Other terms may have multiple connotations in the art. Therefore, the following definitions are provided as an aid to understanding the description herein. The invention as set forth in the claims should not necessarily be limited by these definitions.

"Heated Platen" refers to e.g. a heated stage, hotplate or other hot surface upon which a work piece can be placed to expose the work piece to heat.

"Conductive heat source" refers to a device that transfers heat to a work piece via direct contact with the work piece and thus heat is conducted from the heat source directly to the work piece being heated. An example of a conductive heat source is a heated platen, where the work piece is contacted with the heated platen.

"Convective heat source" refers to a device that transfers heat to a work piece via a gas or liquid by the circulation of currents from one region to another. An example of a convective heat source is a heat gun, which blows hot air onto a work piece to heat the work piece.

"Inductive heat source" refers to a device that transfers heat to a work piece via inducing electrical eddy currents in the work piece by exposure to a magnetic field produced by an electrical coil (typically using alternating current therethrough). Heat is generated in the work piece via resistance (Joule heating) or via magnetic hysteresis losses in material. An example of an inductive heat source is a magnetic induction welder. For example, plastics may be welded by induction, if they are either doped with ferromagnetic ceramics (where magnetic hysteresis of the particles provides the heat) or doped with metallic particles (where electrical resistance within the metal particles provides the heat).

"Radiative heat source" refers to a device that transfers heat to a work piece via energy radiated to the work piece, and once striking the work piece, the energy is transferred to the molecules of the work piece, thus exciting the molecules to increase molecular motion and heating the work piece due to the molecular motion and/or friction. Examples of radiative heat sources are lasers, microwave generators, infrared radiation generators and the like.

"Envelop" is meant to mean that once separator layers are sealed, they serve as a continuous wrapping or covering for an end or edge of an electrode of a jellyroll electrode assembly. "Envelop" is not necessarily meant to mean encapsulating the entire electrode as in the traditional sense of the term. Thus "envelop" can mean, for example, once separator layers are sealed together, an electrode resides in a pouch of the separator material or a bifold of the separator material. "Envelop" can also mean, for example, closing, for example heating sealing together two edge portions of, separator material over an otherwise exposed electrode.

"Seal" means to join separator layers by fusing or melting them together for example by applying heat to the layers at, about or above the melting temperature of the separator layers or a component of the separator layers so that the layers fuse together. Typically, but not necessarily, sealing is done near the edges of layers where the layers overlap or adjoin but are not yet attached. In one example, the layers are polypropylene and the layers are heated along substantially co-extensive edge regions so that they melt together to make a continuous layer and thus are "sealed" together.

B. Overview

Embodiments are most generally described in terms of selective methods of sealing separators and jellyroll electrode assemblies made using such methods. More particularly, methods of selectively heat sealing separators so as to envelop only one of two electrodes at the end of a jellyroll assembly are described. These methods may be applied to one or both ends of the jellyroll. In particular embodiments, the jellyroll assemblies are used for nickel-zinc rechargeable cells.

Individual electrode layer assemblies are sandwiched between one or more layers of separator materials. The sandwiched electrode assemblies are stacked and then wound into a jellyroll assembly. Separator and electrode layer materials are configured so that, once an end of the jellyroll assembly is subjected to heat sealing, separator layers are sealed selectively enveloping only one of the sandwiched electrode assemblies. As mentioned, selectively enveloping a single electrode assembly avoids use of extra separator material, e.g., used to unnecessarily envelop both electrode assemblies, and thus saves costs and allows for greater flexibility in internal cell design. Heat sealed separators as described herein, and methods of heat sealing, produce cells with greater cycle life.

Below is a brief discussion of nickel zinc battery chemistry as it relates to the invention, followed by more detailed discussion of battery design with focus on specific features of the present invention.

Electrochemical Reactions of Nickel Zinc Batteries

The charging process for a nickel hydroxide positive electrode in an alkaline electrochemical cell is governed by the following reaction:

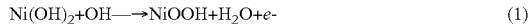
$$Ni(OH)_2 + OH^- \rightarrow NiOOH + H_2O + e^- \quad (1)$$

Alkaline electrolyte acts as ion carrier in the Zn electrode. In the rechargeable Zn electrode, the starting active material is the ZnO powder or a mixture of zinc and zinc oxide powder. The ZnO powder dissolves in the KOH solution, as in reaction (2), to form the zincate ($Zn(OH)_4^{2-}$) that is reduced to zinc metal during the charging process, as in reaction (3). The reaction at the Zn electrode can be written as follows:

$$ZnO + 2OH^- + H_2O \rightarrow Zn(OH)_4^{2-} \quad (2)$$

and

$$Zn(OH)_4^{2-} + 2e^- \rightarrow Zn + 4OH^- \quad (3)$$

Therefore, net electrode at the negative is

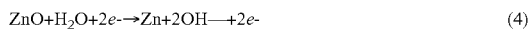
$$ZnO + H_2O + 2e^- \rightarrow Zn + 2OH^- - 2e^- \quad (4)$$

Then, the overall Ni/Zn battery reaction can be expressed as follows:

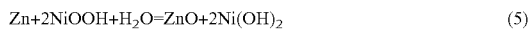
$$Zn + 2NiOOH + H_2O = ZnO + 2Ni(OH)_2 \quad (5)$$

In the discharging process of the zinc electrode, the zinc metal donates electrons to form zincate. At the same time, the concentration of the zincate in the KOH solution increases.

Upon recharge, reactions (1)-(5) are repeated. During the life of a nickel zinc battery, these charge-discharge cycles are repeated a number of times. The invention addresses the efficiency of the zinc negative electrode, for example, battery cells employing the heat sealed separators of the invention allow for many more charge-discharge cycles.

C. Embodiments

A more detailed description of nickel zinc batteries, including description of electrode and components, particularly the embodiments relating to selective methods of sealing separators and jellyroll assemblies containing selectively sealed separators, follows.

Nickel-Zinc Battery and Battery Components

FIGS. 1A and 1B are graphical representations of the main components of a cylindrical power cell according to one embodiment, with FIG. 1A showing an exploded view of the cell. Alternating electrode and electrolyte layers are provided in a cylindrical assembly 101 (also called a "jellyroll"). The cylindrical assembly or jellyroll 101 is positioned inside a can 113 or other containment vessel. The can may be plated on the inside with e.g tin to aid in electrical conduction. A negative collector disk 103 (e.g. copper, optionally plated with e.g. tin) and a positive collector disk 105 (e.g. nickel, e.g. in the form of a foam) are attached to opposite ends of cylindrical assembly 101. The negative and positive collector disks function as internal terminals, with the negative collector disk electrically connected to the negative electrode and the positive collector disk electrically connected to the positive electrode. A cap 109 and the can 113 serve as external terminals. In the depicted embodiment, negative collector disk 103 includes a tab 107 for connecting the negative collector disk 103 to cap 109. Positive collector disk 105 is welded or otherwise electrically connected to can 113. In other embodiments, the negative collector disk connects to the can and the positive collector disk connects to the cap.

The negative and positive collector disks 103 and 105 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution. Negative collector disks are typically copper, optionally coated with tin, and positive collector disks typically are nickel or at least include nickel in their composition.

A flexible gasket 111 rests on a circumferential bead 115 provided along the perimeter in the upper portion of can 113, proximate to the cap 109. The gasket 111 serves to electrically isolate cap 109 from can 113. In certain embodiments, the bead 115 on which gasket 111 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment typically by a crimping process using the portion of the can above bead 115 and crimping that annular portion of can 113 inward and over the top portion of gasket 111. In certain embodiments, a sealing agent is used to prevent leakage. Examples of suitable sealing agents include bituminous sealing agents, tar and VERSAMID™ available from Cognis of Cincinnati, Ohio.

Battery can 113 is the vessel serving as the outer housing or casing of the final cell. In conventional cells, where the can is the negative terminal, it is typically nickel-plated steel. As indicated, in certain embodiments the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion.

In embodiments where the can is positive and the cap negative, the can may be a composition similar to that used in convention nickel—cadmium cells, typically nickel-plated steel. In some embodiments, the interior of the positive polarity can may be coated with a material to aid hydrogen recombination. Any material that catalyzes hydrogen recombination may be used. An example of such a material is silver oxide. In another embodiment, the negative collector disc is a metal disc coated with a hydrogen evolution resistant material, e.g., at least one of a metal, an alloy and a polymer. The negative disc, for example, can be a steel, brass or copper disk coated with at least one of tin, silver, bismuth, brass, zinc and lead. In one example the disc is brass or copper coated with tin and/or silver. In one embodiment, at least a portion of the disc is coated with a polymer, for example, Teflon™ (a trade name by E.I. Dupont de Nemours and Company, of Wilmington Del., for polytetrafluoroethylene).

FIG. 1C depicts a more specific configuration of a jellyroll nickel zinc cell. This cell is similar to that in FIGS. 1A and 1B, having a jellyroll electrode assembly 101, a can 113, a cap 109, a flexible gasket 111, etc., but in this example, the negative collector disk, 103a, is slotted and there are vertical (decending) tabs, or energy directors, 108 for forming electrical connection to the wound negative current collector at the top of jellyroll 101. When this cell is assembled tabs 108 are pressed against the negative current collector and the topmost portion of negative current collector disk 103a presses against cap 109 to complete the electrical connection between the negative current collector and cap 109. In one embodiment, tabs 108 are configured so as not to rip or tear into the negative current collector (as depicted, tabs 108 have curved portions, e.g. in this depiction like skis, which rest on the negative current collector). Negative current collector disk 103a, also has a center hole for introducing electrolyte to the jellyroll. The positive current collector disk can also be configured as disk 103a, where the center hole is used to facilitate electrolyte flow, e.g. where an electrolyte reservoir is maintained at the lower portion of the cell, between the bottom of jellyroll and the bottom of the can. In this embodiment however, positive current collector disk 105a is perforated as described for disk 105 in FIG. 1A, except that disk 105a also includes protrusions 112 which make electrical contact with the wound positive current collector at the bottom of the jellyroll 101. In one embodiment, the wound positive current collector is folded over against the bottom of jellyroll 101 and protrusions 112 pierce the folded positive current collector to establish electrical contact.

In certain embodiments, the cell is configured to operate in an electrolyte "starved" condition. Further, in certain embodiments, nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. Starved format cells are discussed in U.S. patent application Ser. No. 11/116,113, filed Apr. 26, 2005, titled "Nickel Zinc Battery Design," published as US 2006-0240317 A1, which is hereby incorporated by reference for all purposes. It may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

Battery cells described herein can have any of a number of different shapes and sizes. For example, cylindrical cells of this invention may have the diameter and length of conventional AAA cells, AA cells, D cells, C cells, etc. Custom cell designs are appropriate in some applications. In a specific embodiment, the cell size is a sub-C cell size of diameter 22 mm and length 43 mm. Note that the present invention also may be employed in relatively small cell formats, as well as various larger format cells employed for various non-portable applications. Often the profile of a battery pack for, e.g., a power tool or lawn tool will dictate the size and shape of the battery cells. One embodiment is a nickel zinc cell including a jellyroll with selectively sealed separators as described herein. One embodiment is a battery pack including one or more nickel-zinc battery cells described herein and appropriate casing, contacts, and conductive lines to permit charge and discharge in an electric device.

Note that the embodiments shown in FIGS. 1A, 1B and 1C have a polarity reverse of that in a conventional commercial cell, for example a commercial nickel-cadmium cell, in that the cap is negative and the can is positive. In conventional power cells, the polarity of the cell is such that the cap is positive and the can or vessel is negative. That is, internally, the positive electrode of the cell assembly is electrically connected with the cap and the negative electrode of the cell assembly is electrically connected with the can that retains the cell assembly. In certain embodiments, including that depicted in FIGS. 1A, 1B and 1C, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap. At least one example of this embodiment is described below.

More detailed description of specific "normal" and "reverse" polarity cells as well as features of a venting cap, the positive electrode, separator, electrolyte and negative electrodes follows.

Venting Cap

Although the cell is generally sealed from the environment, the cell may be permitted to vent gases from the battery that are generated during charge and discharge. Thus in reference for example to FIG. 1A, cap 109 is shown generically as a non-venting cap, but typically is a venting cap. A typical nickel cadmium cell vents gas at pressures of approximately 200 pounds per square inch (psi). In some embodiments, a nickel zinc cell is designed to operate at this pressure and even higher (e.g., up to about 300 psi) without the need to vent. This may encourage recombination of any oxygen and hydrogen generated within the cell. In certain embodiments, the cell is constructed to maintain an internal pressure of up to about 450 psi and or even up to about 600 psi. In other embodiments, a nickel zinc cell is designed to vent gas at relatively lower pressures. This may be appropriate when the design encourages controlled release of hydrogen and/or oxygen gases without their recombination within the cell.

Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Positive Electrode

The nickel hydroxide electrode has been used as the positive electrode in high power and high energy nickel-metal hydride batteries, nickel-cadmium batteries and nickel-zinc batteries. The nickel positive electrode generally includes electrochemically active nickel oxide or hydroxide or oxyhydroxide and one or more additives to facilitate manufacturing, electron transport, wetting, mechanical properties, etc. For example, a positive electrode formulation may include nickel hydroxide particles, zinc oxide, cobalt oxide (CoO), cobalt metal, nickel metal, and a thixotropic agent such as carboxymethyl cellulose (CMC). Note that the metallic nickel and cobalt may be provided as chemically pure metals or alloys thereof. The positive electrode may be made from paste containing these materials and a binder such as a polymeric fluorocarbon (e.g., Teflon™).

In certain embodiments, the nickel hydroxide electrode includes nickel hydroxide (and/or nickel oxyhydroxide), cobalt/cobalt compound powder, nickel powder and binding materials. The cobalt compound is included to increase the conductivity of the nickel electrode. In one embodiment, the nickel positive electrode includes at least one of cobalt oxide, cobalt hydroxide, and/or cobalt oxyhydroxide; optionally coated on nickel hydroxide (or oxyhydroxide) particles.

A nickel foam matrix may be used to support the electroactive nickel oxide (e.g., $Ni(OH)_2$) electrode material. The foam substrate thickness may be may be between 15 and 60 mils. The thickness of the positive electrode, which includes nickel foam filled with the electrochemically active and other electrode materials, ranges from about 16-24 mils, preferably about 20 mils thick. In one embodiment, a nickel foam density of about 350 $g/m^2$ and thickness ranging from about 16-18 mils is used.

In certain embodiments, the batteries include a non-nickel positive electrode (e.g., a silver or air electrode). The silver-zinc system employs silver-oxide as the positive electrode, while the zinc-air system employs a gas-diffusion electrode containing catalysis for oxygen reduction-production.

The Separator

Typically, a separator will have small pores. In certain embodiments the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a certain embodiments, the separator includes at least two layers (and preferably exactly two layers)—a barrier layer to block zinc penetration and a wetting layer to keep the cell wet with electrolyte, allowing ionic current to flow. This is generally not the case with nickel cadmium cells, which employ only a single separator material between adjacent electrode layers.

Performance of the cell may be aided by keeping the positive electrode wet and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 per cent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting (or wicking) layer may be made of any suitable wettable separator material. Typically the wetting layer has a relatively high porosity e.g., between about 50 and 85% porosity. Examples include polyamide materials such as nylon-based as well as wettable polyethylene, polypropylene and cellulose-based materials. One particular material is cellulose impregnated and/or coated with polyvinylalcohol. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable. Embodiments are directed toward selectively sealing separators. Virtually any separator material will work so long as it can be sealed via application of one of the heat sources described herein. In some embodiments, separator materials of differing melting points are employed, in other embodiments separators that seal are employed in conjunction with those that do not seal under the conditions to which one or both ends of the jellyroll are exposed.

Another consideration in the electrode/separator design is whether to provide the separator as simple sheets of approximately the same width as the electrode and current collector sheet or to encase one or both electrodes in separator layers. In the latter example, the separator serves as a "bag" for one of the electrode sheets, effectively encapsulating an electrode layer. In some embodiments, enveloping the negative electrode in a separator layer will aid in preventing dendrite formation. Specific heat sealing embodiments are described in more detail below in relation to the section entitled, "Electrodes and Separator Assembly—The Jellyroll."

The Electrolyte

In certain embodiments pertaining to nickel-zinc cells, the electrolyte composition limits dendrite formation and other forms of material redistribution in the zinc electrode. Examples of suitable electrolytes are described in U.S. Pat. No. 5,215,836 issued to M. Eisenberg on Jun. 1, 1993, which is hereby incorporated by reference. In some cases, the electrolyte includes (1) an alkali or earth alkali hydroxide, (2) a soluble alkali or earth alkali fluoride, and (3) a borate, arsenate, and/or phosphate salt (e.g., potassium borate, potassium metaborate, sodium borate, sodium metaborate, and/or a sodium or potassium phosphate). In one specific embodiment, the electrolyte includes about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications includes about 8.5 equiv/liter of hydroxide, about 4.5 equivalents of boric acid and about 0.2 equivalents of potassium fluoride.

Embodiments are not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may include a liquid and a gel. The gel electrolyte may include a thickening agent such as CARBOPOL™ available from Noveon of Cleveland, Ohio. In a preferred embodiment, a fraction of the active electrolyte material is in gel form. In a specific embodiment, about 5-25% by weight of the electrolyte is provided as gel and the gel component includes about 1-2% by weight CARBOPOL™.

In some cases, the electrolyte may contain a relatively high concentration of phosphate ion as discussed in U.S. Pat. No. 7,550,230, entitled "Electrolyte Composition for Nickel Zinc Batteries," filed Feb. 1, 2006, by J. Phillips and S. Mohanta, which is incorporated herein by reference for all purposes.

The Negative Electrode

As applied to nickel-zinc cells, the negative electrode includes one or more electroactive sources of zinc or zincate ions optionally in combination with one or more additional materials such as surfactant-coated particles, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may include one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide.

Active material for a negative electrode of a rechargeable zinc alkaline electrochemical cell may include zinc metal (or zinc alloy) particles. If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada. In one embodiment, the electrochemically active zinc metal component of nickel zinc cells contains less than about 0.05% by weight of lead. Tin may also be used in the zinc negative electrode.

In certain embodiments, the zinc metal particles may be coated with tin and/or lead. The zinc particles may be coated by adding lead and tin salts to a mixture containing zinc particles, a thickening agent and water. The zinc metal can be coated while in the presence of zinc oxide and other constituents of the electrode. A zinc electrode containing lead or tin coated zinc particles is generally less prone to gassing when cobalt is present in the electrolyte. The cycle life and shelf life of the cells is also enhanced, as the zinc conductive matrix remains intact and shelf discharge is reduced. Exemplary active material compositions suitable for negative electrodes of this invention are further described in U.S. patent application Ser. No. 12/467,993, entitled "Pasted Zinc Electrode for Rechargeable Nickel-Zinc Batteries," by J. Phillips et. al., filed May 18, 2009, which is hereby incorporated by reference for all purposes.

The zinc active material may exist in the form of a powder, a granular composition, fibers, etc. Preferably, each of the components employed in a zinc electrode paste formulation has a relatively small particle size. This is to reduce the likelihood that a particle may penetrate or otherwise damage the separator between the positive and negative electrodes.

Considering the electrochemically active zinc components in particular (and other particulate electrode components as well), such components preferably have a particle size that is no greater than about 40 or 50 micrometers. In one embodiment the particle size is less than about 40 microns, i.e. the average diameter is less than about 40 microns. This size regime includes lead coated zinc or zinc oxide particles. In certain embodiments, the material may be characterized as having no more than about 1% of its particles with a principal dimension (e.g., diameter or major axis) of greater than about 50 micrometers. Such compositions can be produced by, for example, sieving or otherwise treating the zinc particles to remove larger particles. Note that the particle size regimes recited here apply to zinc oxides and zinc alloys as well as zinc metal powders.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc.

Various organic materials may be added to the negative electrode for the purpose of binding, dispersion, and/or as surrogates for separators. Examples include hydroxylethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (e.g., the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

Finally, it should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps may be taken to preserve battery components, including the negative electrode, in their chemically useful form. When electrode materials corrode or otherwise degrade to a significant extent over weeks or months without use, their value becomes limited by short shelf life.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Conductive fibers added to the negative electrode may also serve the purpose of irrigating or wetting the electrode. Surfactant coated carbon fibers are one example of such material. However, it should be understood that other materials may be included to facilitate wetting. Examples of such materials include titanium oxides, alumina, silica, alumina and silica together, etc. Generally, when present, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Zinc negative electrodes contain materials that establish conductive communication between the electrochemically active component of the zinc negative electrode and the nickel positive electrode. The inventors have found that introduction of surfactant-coated particles into the negative electrode increases the overall current carrying capability of the electrode, particularly surfactant coated carbon particles, as described in U.S. patent application Ser. No. 12/852,345, filed Aug. 6, 2010, titled, "Carbon Fiber Zinc Negative Electrode," by Jeffrey Phillips, which is incorporated herein by reference for all purposes.

As mentioned, a slurry/paste having a stable viscosity and that is easy to work with during manufacture of the zinc electrode may be used to make the zinc negative electrode. Such slurry/pastes have zinc particles optionally coated by adding lead and tin salts to a mixture containing the zinc particles, a thickening agent and a liquid, e.g. water. Constituents such as zinc oxide (ZnO), bismuth oxide ($Bi_2O_3$), a dispersing agent, and a binding agent such as Teflon are also added. Binding agents suitable for this aspect include, but are not limited to, P.T.F.E., styrene butadiene rubber, polystyrene, and HEC. Dispersing agents suitable for this aspect include, but are not limited to, a soap, an organic dispersant, an ammonium salt dispersant, a wax dispersant. An example of commercially available dispersants in accord with this aspect of the invention is a Nopcosperse™ (trade name for a liquid series of dispersants available from Nopco Paper Technology Australia Pty. Ltd.). Liquids suitable for this aspect include, but are not limited to, water, alcohols, ethers and mixtures thereof.

The Electrodes and Separator Assembly—The Jellyroll

As mentioned, this invention is described in terms of methods of selectively heat sealing separators so as to envelop only one of two electrodes at the end of a jellyroll assembly. In particular embodiments, the jellyroll assemblies are used for nickel-zinc rechargeable cells.

To make a jellyroll, individual electrode layer assemblies are sandwiched between one or more layers of separator materials. The sandwiched electrode assemblies are stacked and then wound into a jellyroll. Particular to some embodiments described herein, separator and electrode layer materials are configured so that, once an end of the jellyroll assembly is subjected to heat sealing, separator layers are sealed selectively enveloping only one of the sandwiched electrode assemblies.

Figure 2A:
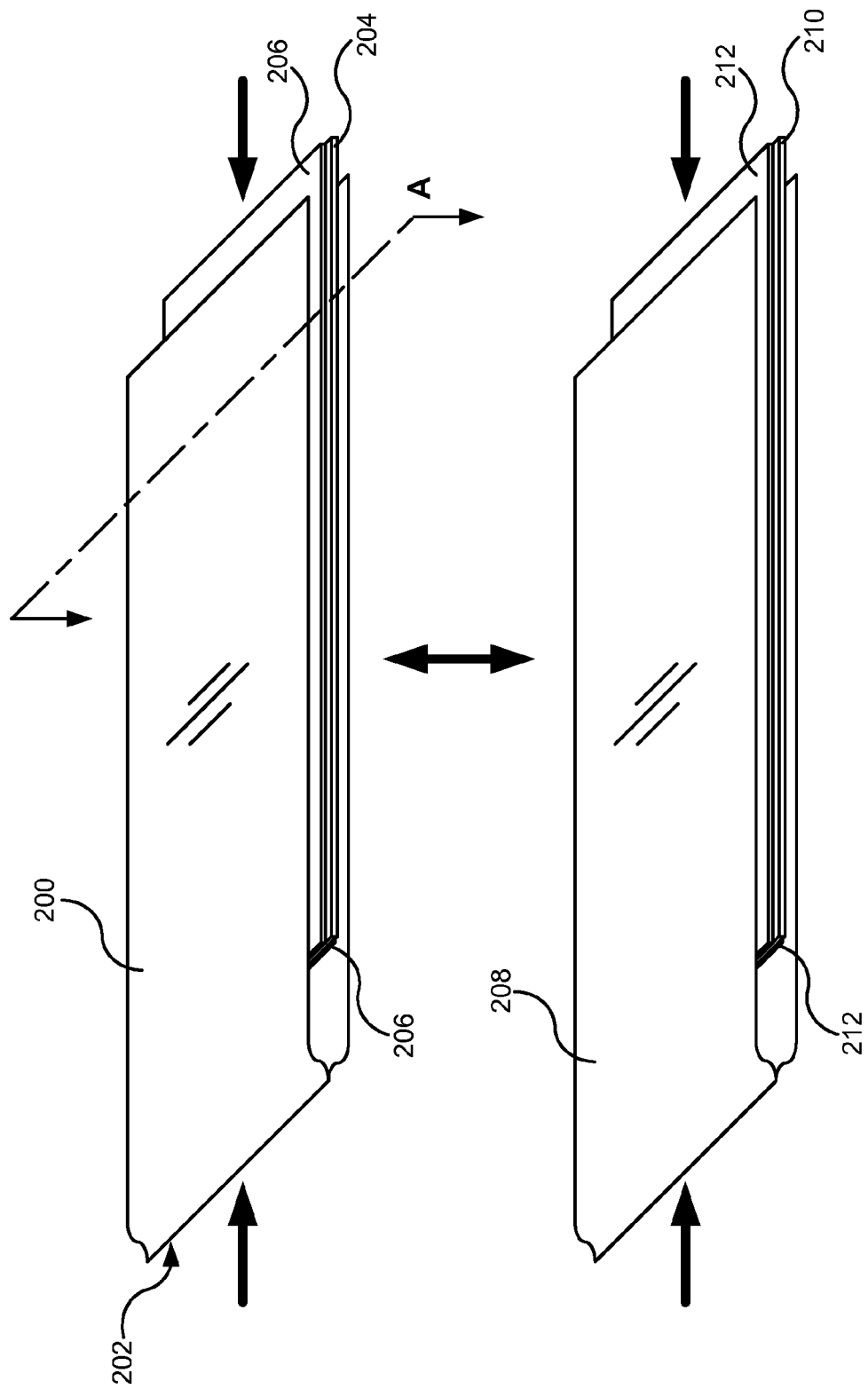
FIG. 2A is a perspective representation showing assembly of electrodes and separator layers prior to winding into a jellyroll.

FIG. 2A is a perspective representation showing assembly of electrodes and separator layers prior to winding into a jellyroll. In the illustrated example, separators (200 and 208) are initially folded over each of the negative electrode (conductive substrate 204 coated on each face with electrochemically active layer 206) and the positive electrode (conductive substrate 210 coated on each face with electrochemically active layer 212) along the electrode's planar surface before being drawn or fed, with the electrode sheets, into a winding apparatus. In this embodiment, each separator sheet is a bifold, where each of the electrodes is inserted (as indicated by the horizontal arrows) into the bifold substantially to fold 202. In this approach two sources of separator are employed. In an alternative embodiment, each electrode sheet is straddled by two separate sources of separator sheet so that four sources of separator, rather than two are employed. Thus, initially, a separator sheet is not folded over the leading edge of an electrode. However, the resulting layered structure is the same. However, the bifold separators make insertion and control of the stack easier when inserting into the winding apparatus. Both approaches produce a structure in which two layers of separator separate each electrode layer from the next adjacent electrode layer. This is generally not the case with nickel cadmium cells, which employ only a single layer of separator between adjacent electrode layers. The additional layers employed in the nickel zinc cell help to prevent shorting that could result from zinc dendrite formation, and when a wicking separator is used, also aid in irrigation and ion current flow.

Dendrites are crystalline structures having a skeletal or tree-like growth pattern ("dendritic growth") in metal deposition. In practice, dendrites form in the conductive media of a power cell during the lifetime of the cell and effectively bridge the negative and positive electrodes causing shorts and subsequent loss of battery function.

Note that the separator sheets generally do not entirely cover the full widths of the electrode sheets. Specifically, one edge (the conductive substrate) of each electrode sheet remains exposed for attaching terminals. In one embodiment, these exposed edges are on opposite sides so that once the jellyroll is wound, each of the positive and the negative electrodes will make electrical contact with the batter terminals at opposite ends of the battery. In another embodiment, the exposed edges are on the same side so that the electrical connections to the battery terminals are made on the same end of the jellyroll.

Figure 2B:
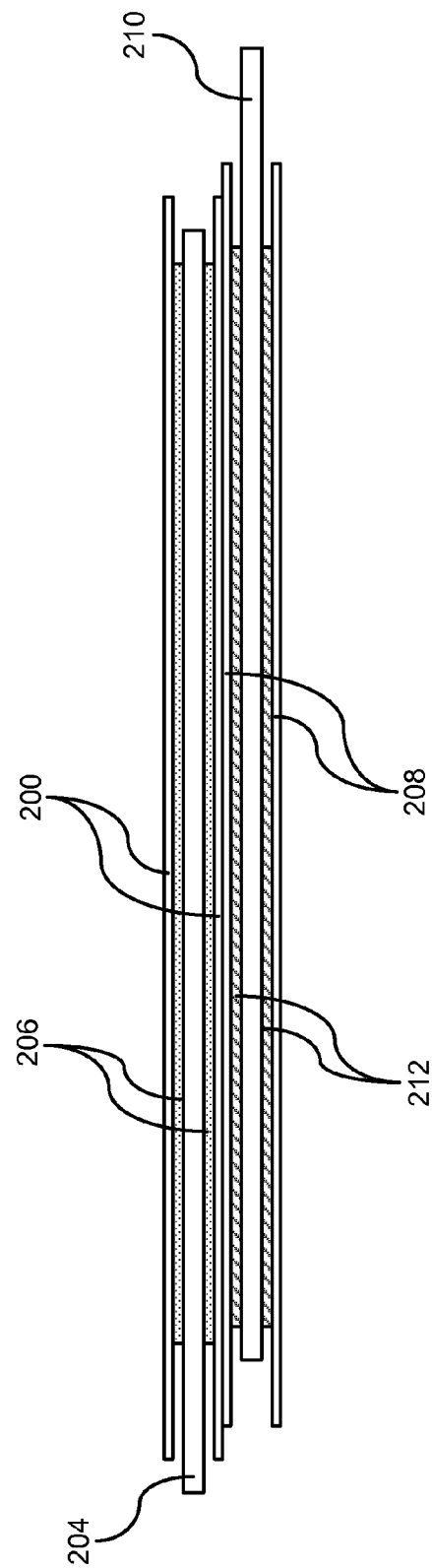
FIG. 2B is a cross section of the assembly in FIG. 2A.

FIG. 2B is a cross section (as indicated by cut A in FIG. 2A) of the assembly formed by stacking (as indicated by the heavy double-headed arrow in FIG. 2A) the individual electrodes with their respective separators in FIG. 2A. Separator 200 mechanically and electrically separates the negative electrode (substrate 204 and electrochemically active layers 206) from the positive electrode (substrate 210 and electrochemically active layers 212) while allowing ionic current to flow between the electrodes. In this embodiment, separator 200 is microporous polypropylene, but the invention is not so limited. As mentioned, the electrochemically active layers 206 of the zinc negative electrode typically include zinc oxide and/or zinc metal as the electrochemically active material and may contain surfactant-coated particles as described above. The layer 206 may also include other additives or electrochemically active compounds such as calcium zincate, bismuth oxide, aluminum oxide, indium oxide, hydroxyethyl cellulose, and a dispersant.

The negative electrode substrate 204 should be electrochemically compatible with the negative electrode materials 206. As described above, the electrode substrate may have the structure of a perforated metal sheet, an expanded metal, a metal foam, or a patterned continuous metal sheet. In some embodiments, the substrate is simply a metal layer such as a metal foil.

Opposite from the negative electrode on the other side of separator 200 is the positive electrode and separator 208. In this embodiment, separator 208 is a cellulose-based material, more specifically cellulose impregnated and/or coated with polyvinylalcohol, but the invention is not so limited. This layer is a wicking layer (e.g. from NKK, as is discussed in more detail in the separator section above). The positive electrode also includes electrochemically active layers 212 and an electrode substrate 210. The layers 212 of the positive electrode may include nickel hydroxide, nickel oxide, and/or nickel oxyhydroxide as electrochemically active materials and various additives, all of which are described herein. The electrode substrate 210 may be, for example, a nickel metal foam matrix or nickel metal sheets. Note that if a nickel foam matrix is used, then layers 212 would form one continuous electrode because they fill the voids in the metal foam and pass through the foam. The layered zinc negative electrode and nickel positive electrode structure is wound into a jellyroll as depicted in FIGS. 1A, 1B and 1C, structure 101.

As seen from FIG. 2B, conductive substrates 204 and 210 are offset laterally so that once the jellyroll is wound, each of the electrodes will be electrically connected to the battery terminals at opposite ends of the jellyroll.

A winding apparatus draws the various sheets in at the same time and rolls them into a jellyroll assembly. After a cylinder of sufficient thickness is produced, the apparatus cuts the layers of separator and electrodes to produce the finished jellyroll assembly 101, as in FIG. 1A.

Figure 2C:
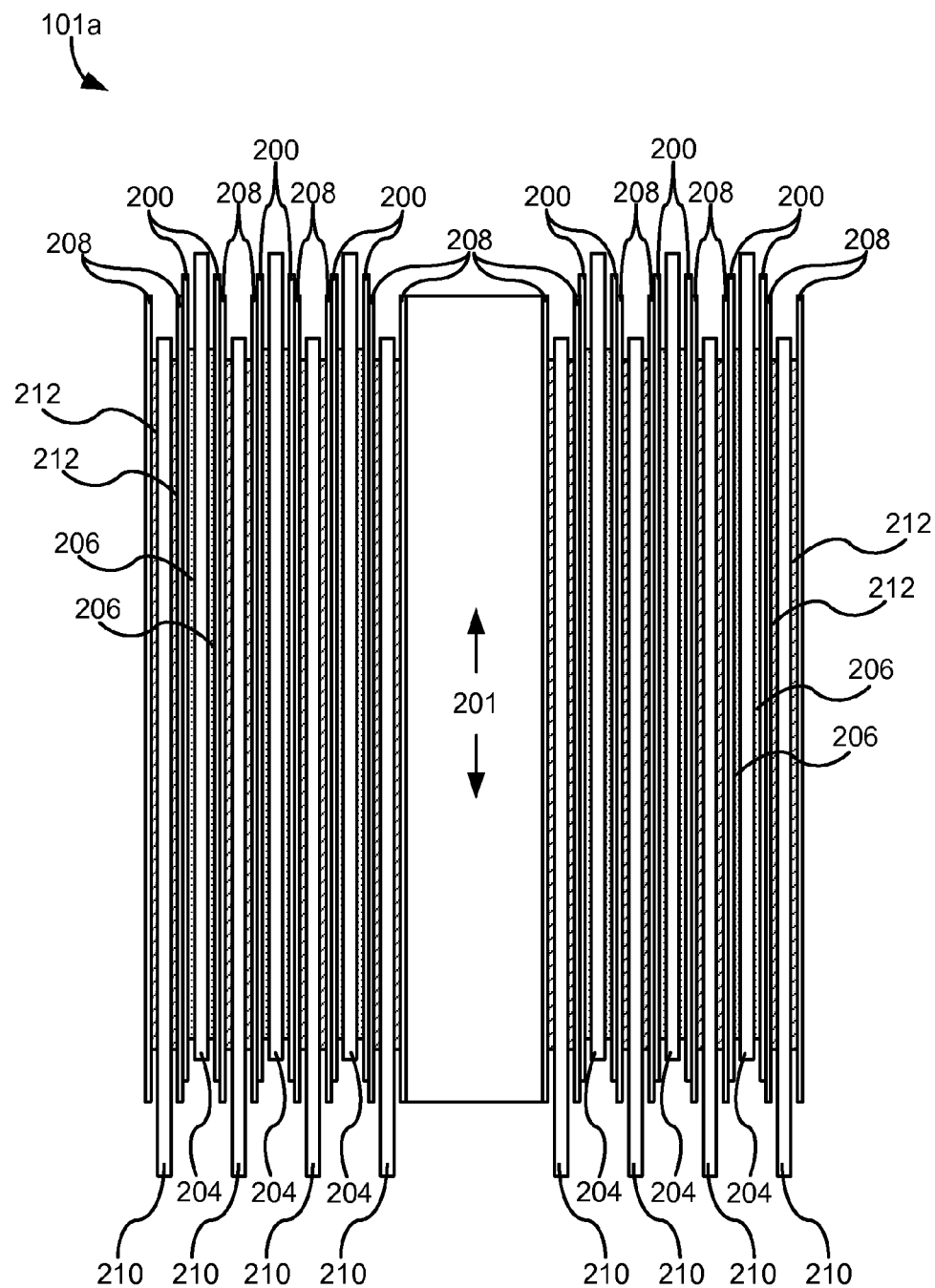
FIG. 2C is a cross section of a jellyroll assembly of the invention.

FIG. 2C is a cross-section (cut B as shown in FIG. 1A) of jellyroll 101a, similar to jellyroll 101 as depicted in FIG. 1A, and specifically where the jellyroll is made by winding the stack structure as described in FIG. 2B. The cross sections of jellyrolls depicted herein are essentially "slices;" that is, some depth detail is avoided in order to simplify the figures. Void 201 is formed when the mandrel of the winding device is removed after the jellyroll is wound. Void 201 serves as an electrolyte reservoir. As mentioned, one embodiment is a method of selectively sealing a first set of separator layers disposed on both sides of and extending past an edge of a first electrode of a jellyroll assembly including two electrodes, while not sealing a second set of separator layers disposed on both sides of and extending past an edge, parallel and proximate to the edge of the first electrode, of a second electrode, both edges disposed on the same end of the jellyroll assembly, while exposing the same end of the jellyroll assembly to a heat source. The FIG. 2C cross section of jellyroll 101a shows that there are alternating layers of separator-sandwiched electrodes as described in relation to FIG. 2B. Importantly, the separator materials protrude past the electrochemically active materials on each electrode, and each of the conductive substrates protrude from the end of the jellyroll, on one end, further than the separator material so that electrical connection can be made to the battery terminals. In this example, a jellyroll for a reverse polarity battery, the negative current collecting substrate 204 protrudes past the electroactive and separator materials at the top of the jellyroll, while the positive current collecting substrate 210 protrudes past the electroactive and separator materials at the bottom of the jellyroll. Negative collector 204 will connect to the vent cap terminal, and positive collector 210 will connect to the battery can, when the battery is assembled as depicted in FIGS. 1A and 1B. Methods described herein selectively seal only one electrode, of two, at either or both ends of a jellyroll. Note that separators, in this example, polypropylene separator 200 and wicking separator 208 are adjoining except for on the outside of the jellyroll, and in the interior of void 201. Note also that at the bottom of the jellyroll separator 200 does not extend as far down as separator 208—in embodiments were both separators 200 and 208 were to be sealed over the negative electrode, this configuration would allow enough of 208 to melt over or combine with 200 when it is sealed. Also having 208 longer at the bottom of the jellyroll is done because electrode substrate 210 extends further down as well, so if sealing is not complete, 210 is further protected by 208. Analogously, at the top of the jellyroll separator 200 extends further upward than 208, because substrate 204 extends further than substrate 210 and thus 204 is further protected by separator 200.

In one embodiment, selectively sealing the first set of separator layers includes: i) configuring the current collecting substrate of the second electrode so that when the heat source is applied to the same end of the jellyroll assembly, the first set of separator layers can seal to envelop the first electrode, but the second set of separator layers are physically obstructed from sealing and enveloping the second electrode; and ii) applying the heat source to the same end of the jellyroll assembly. In this example, heat sealing is done at the bottom of the jellyroll where current collector substrate 210 protrudes beyond the separator layers.

Figure 2D:
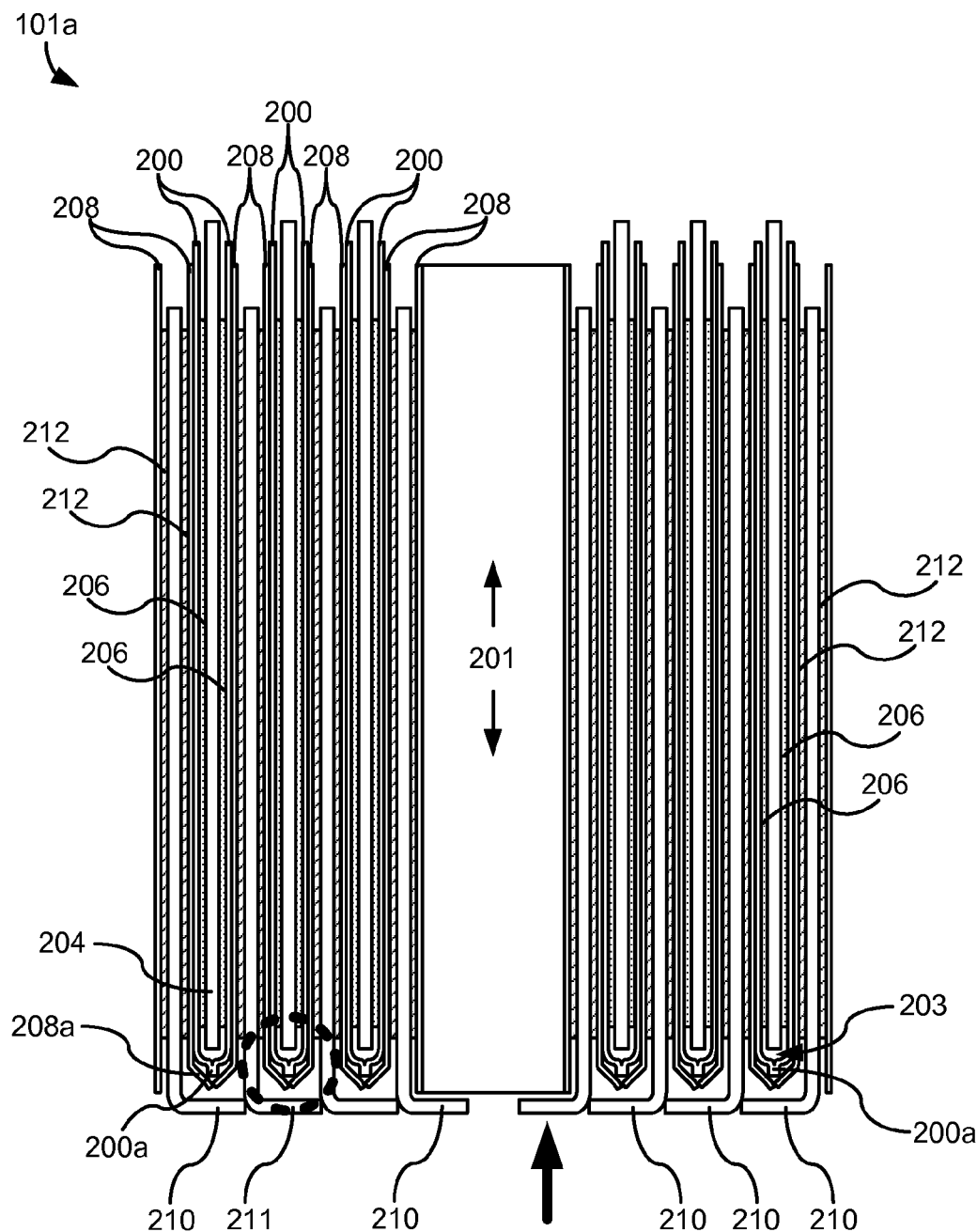
FIG. 2D is a cross section of a jellyroll assembly after a current collecting substrate is folded in a particular configuration and after selective heat sealing at one end of the jellyroll.

In one embodiment, configuring the current collecting substrate of the second electrode includes folding the current collecting substrate of the second electrode substantially over, but not touching, the current collecting substrate of the first electrode, so that a substantially enclosed volume is formed, where the first set of separator layers and adjoining separator layers from the second set of separator layers are disposed in the substantially enclosed volume. FIG. 2D depicts a cross section of jellyroll 101a after current collecting substrate 210 has been folded over and heat applied to that end of the jellyroll to heat seal the negative electrode (which includes current collector 204 and electrochemically active material 206). Folding can be done manually or with, e.g., a rolling machine that grasps the jellyroll assembly and applies a roller (from outer edge of jellyroll towards inner edge in this example) to fold the current collector over as depicted.

Referring again to FIG. 2D, after collector 210 is folded over, a volume 211 is formed (as indicated by the heavy dotted circle) where the separator materials at the end of the assembly are surrounded by the positive current collector 210 on three sides, the vertical walls and the bent over portion of collector 210. When configured in this way, and when heat is applied to the bottom end of the jellyroll (as indicated by the heavy upward arrow) on the folded over outer surfaces of current collector 210, the polypropylene separator melts and fuses to form a continuous layer as indicated at fusion point 200a. The configuration of current collector 210 serves at least three purposes in this example. The foldover aids transmission of heat to volume 211 (essentially a small oven). The extension of 210 beyond the separator materials physically blocks separator material 208 from sealing over (if it were sealable, embodiments include dual separators where both are heat sealable) or folding over current collector 210. Finally, the extension past the separators also allows electrical communication of the current collector with the can (e.g. via current collecting disk 105) and the foldover maximizes electrical contact with the can or current collector disk.

Once this seal is formed, a small volume, 203, can be formed which, along with the foldover, saves valuable space in the battery assembly so that more electroactive material can be used (because effectively the electrodes can be taller). In this example, as indicated by 208a, wicking layers from the next nearest positive wind do not fuse because it is a cellulose based material and does not melt (although it may deform as depicted). Heat sealing used for cells described herein are not limited in this way. In some embodiments, both separators (or in some embodiments more than two separator layers) are made of material that can fuse to form a double seal over one of the electrodes. That is, if the two different separator materials are compatible to melt together they may form a single layer fused end, but double thick. If the two different separator materials are not compatible to melt together, a bilayer seal is formed. In this embodiment, the current collectors are configured so that when a sealing heat is applied, only one of the electrodes can be encapsulated because there is a physical barrier preventing the other electrode, in this example the positive, from being sealed under the separator (although volumes 211 protect the positive from contamination).

Figure 2E:
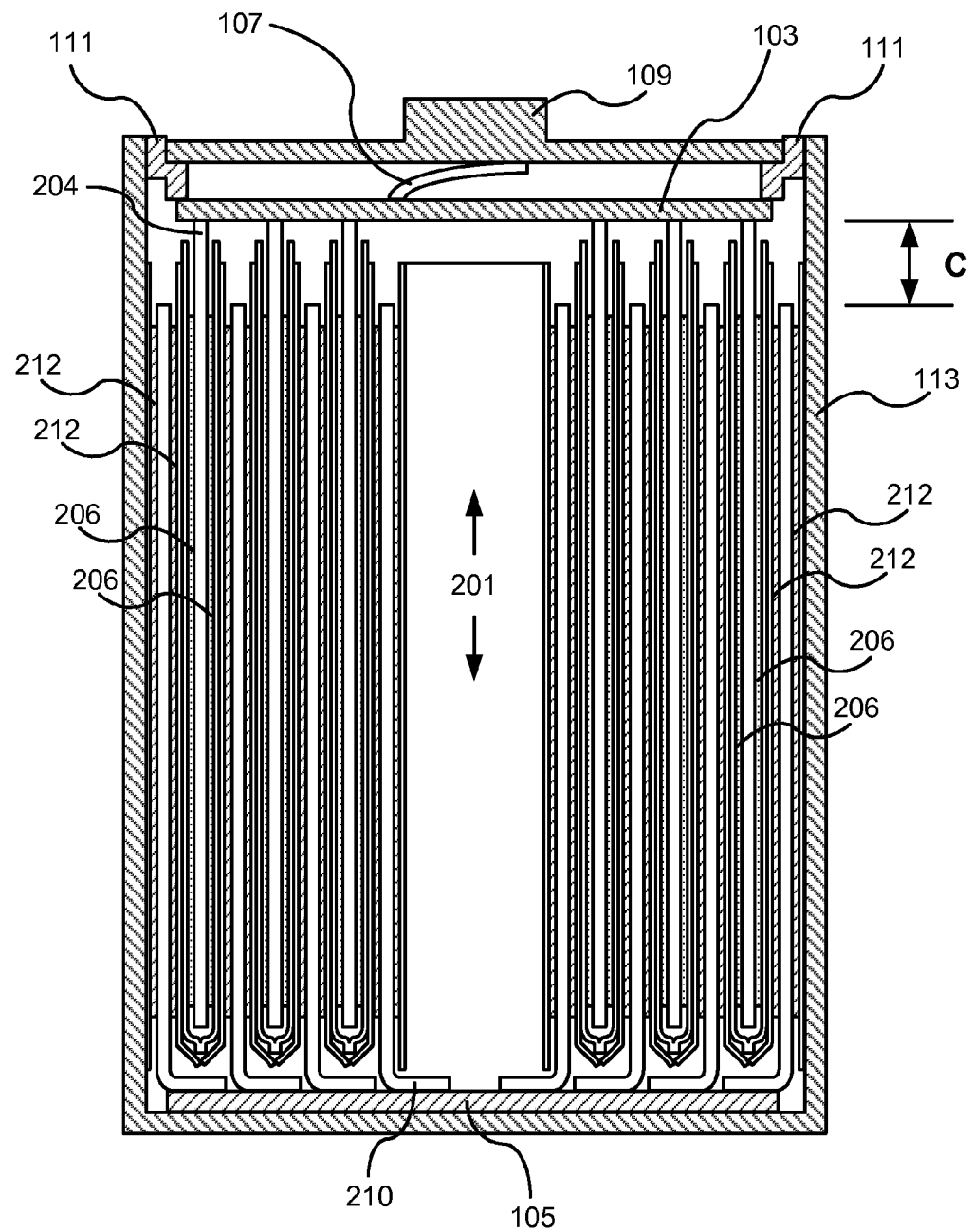
FIG. 2E is a cross section of the jellyroll assembly of FIG. 2D incorporated into a reverse polarity battery.

FIG. 2E depicts the selectively heat sealed jellyroll assembly 101a incorporated into a final battery assembly analogous to that described in FIGS. 1A and 1B. Current collecting disk 105 makes contact with the folded over surface of positive current collector 210 for improved current transfer. Current collector substrate 204 makes contact with, and thus is in electrical communication with, current collector disk 103. While not wishing to be bound to theory, it is believed that shorts due to particle contamination are more likely when current collecting substrates are folded over and thus, in this example, positive substrate 210 is in direct line of sight with negative current collecting substrate 204. Sealing, in this example, the negative electrode prevents particles causing shorts between the electrodes. At the top of jellyroll 101a, where the negative substrate 204 make electrical contact with a negative current collector disk 103, substrates 204 and 210 are not in direct line of sight and therefore for any dendrite growth would have to migrate from electrochemically active material 206, up and over both separator layers 200 and 208, and down again to substrate 210 in order to cause a short. Thus configuring the electrodes at the top of jellyroll is done is such a way that the electrodes are not in direct line of sight with each other and the difference in height, C, between the electrodes is sufficiently different, coupled with the separators forming a traversal barrier obviates the need to seal separators at this end of the jellyroll. The invention is not so limited however. In some embodiments, the electrodes and separators are configured so that selective sealing of one of the two electrodes is done on both ends of the jellyroll, for example where it is desirable to minimize the relative distance between the positive and negative electrodes at both ends of the jellyroll. Can 113, tab 107, gasket 111 and cap 109 are analogous to those described in relation to FIGS. 1A and 1B.

Figure 2F:
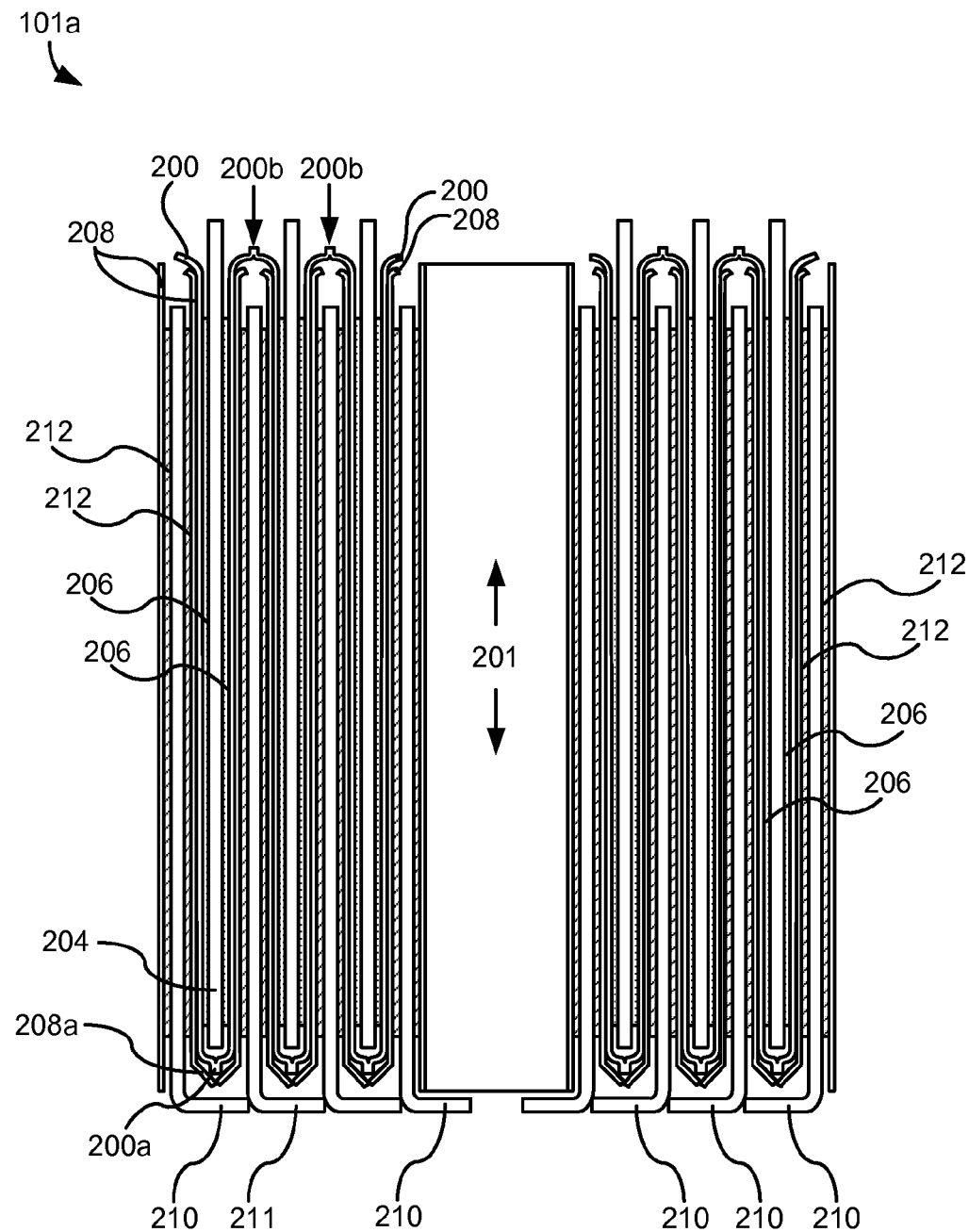
FIG. 2F is a cross section of the jellyroll assembly as described in relation to FIG. 2D after the opposite end of the jellyroll is subjected to selective heat sealing.
Figure 2G:
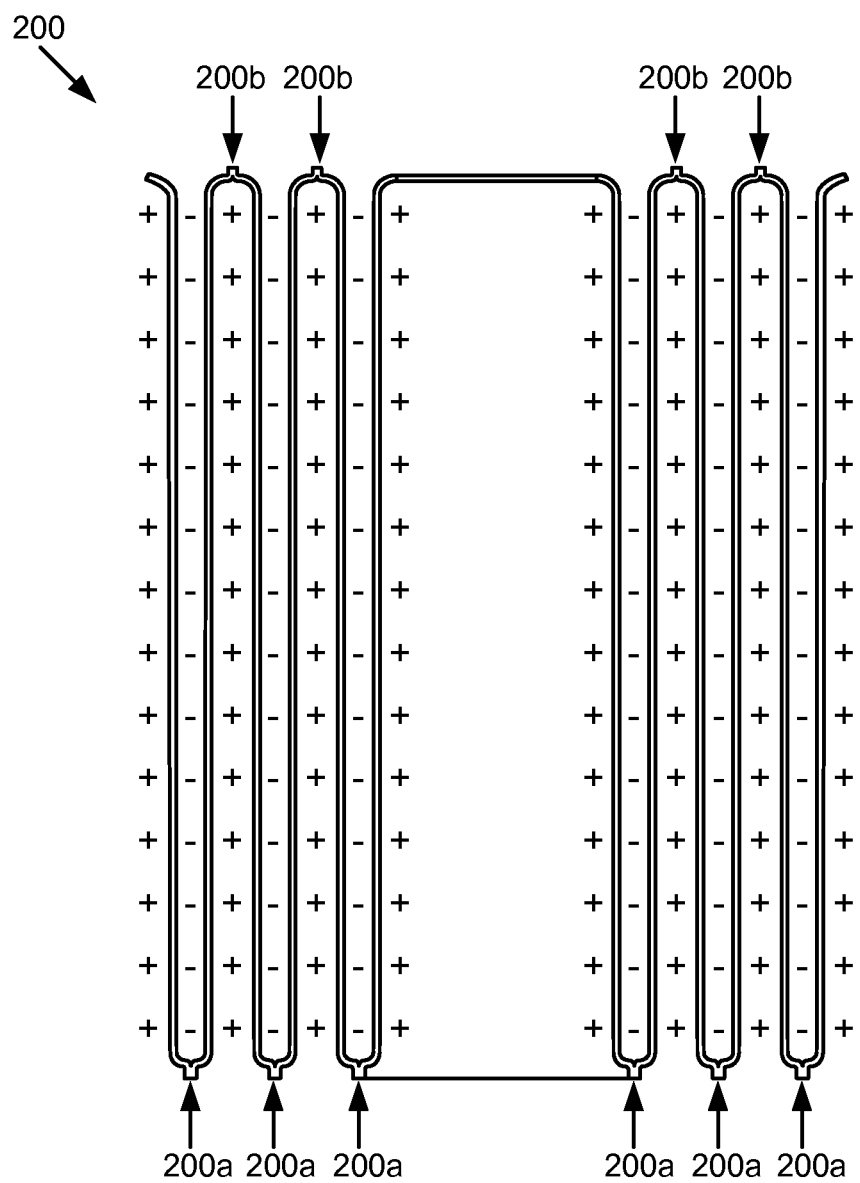
FIG. 2G is a cross section of a sealed separator from the jellyroll described in relation to FIG. 2F.
Figure 2H:
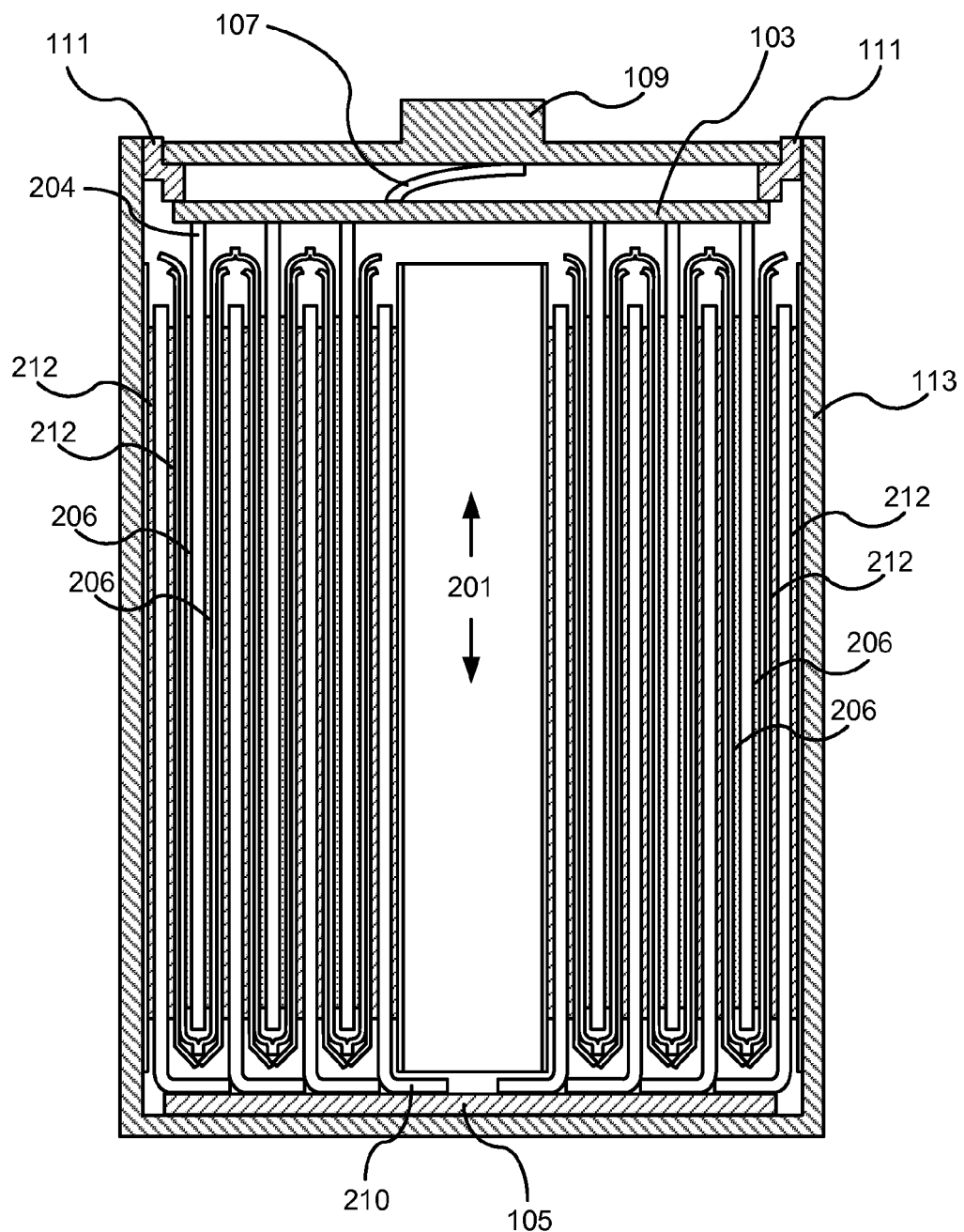
FIG. 2H is a cross section of the jellyroll assembly of FIG. 2F incorporated into a reverse polarity battery.

FIG. 2F depicts a cross section of jellyroll 101a, as depicted in FIG. 2D, where heat has been applied to the top (as depicted) of the jellyroll. Here, both ends of the jellyroll have been subjected to selective sealing. The bottom (as depicted) is sealed as described in relation to FIG. 2D. At the top of the jellyroll, selective sealing is achieved by virtue of the arrangement of the separators and the electrodes at this end of the jellyroll. When heat is appropriately applied, for example pressing the top of the jellyroll onto a hot platen as described herein, layers of separator 200 are fused at points 200b, in between neighboring layers of the negative substrate 204. Separator layers 208 do not fuse (supra) but are encapsulated by fusions 200b, at least in internal layers of the jellyroll. On the outermost layer and innermost layer, separator 200 is melted, but being the outermost and innermost layers, each has no complimentary layer of separator 200 to make a corresponding fusion 200b. Still, fusion of the interior layers of 200 at this end of the jellyroll encapsulates the positive electrode. Also, by virtue of the outermost and innermost layers of separator 200 deforming due to exposure to heating, there is at least some additional protection (partial enclosure) of the outermost and innermost positive electrodes at the top end of the jellyroll. Essentially, separator layers 200 have been fused into a single sheet of separator formed into concentric tubes that have open portions at the top and the bottom. FIG. 2G depicts separator layers 200, now fused into a single separator 200, by virtue of fusions 200a and 200b. In FIG. 2G, the wicking separator layers are not depicted and the electrodes are depicted only as series of "+" and "−". By virtue of seals 200b and 200a, the positive material is protected from the negative at the top (as depicted) end of the jellyroll, and the negative material is protected from the positive material at the bottom of the jellyroll, respectively. Thus, selective sealing in this example at both ends of the jellyroll, encapsulates the negative electrode at one end of the jellyroll and encapsulates the positive electrode at the other end of the jellyroll. Using selective sealing after winding allows formation of a unique unitary separator structure, 200. FIG. 2H depicts the jellyroll of FIG. 2F incorporated into a reverse polarity battery, where the components are analogous to those described in relation to FIG. 2E, for example negative cap 109, positive current collector 105, etc.

In one embodiment, selectively sealing the first set of separator layers includes: i) configuring the jellyroll assembly such that the first set of separator layers includes layers that can seal to envelop the first electrode when the heat source is applied, but the second set of separator layers includes layers that can not seal to envelop the second electrode when the heat source is applied; and ii) applying the heat source to the same end of the jellyroll assembly. As depicted in, but not limited to, the example described in relation to FIGS. 2F and 2G (and, for example, FIGS. 2M and 2N below), in one embodiment, the method further includes configuring the jellyroll assembly such that the first set of separator layers includes layers that can seal to envelop the second electrode at the other end of the jellyroll when the heat source is applied to that end of the jellyroll, and applying the heat source to the other end of the jellyroll. In one embodiment, as applied to the embodiments described above, the first set of separator layers and the second set of separator layers each have different melting points. In another embodiment, as applied to the embodiments above, the first set of separator layers are made of materials that can melt and fuse when the sealing heat is applied and the second set of separator layers are materials that can not melt and fuse when the same sealing heat is applied. An example of the latter embodiment is where the first set of separator layers are polypropylene layers and the second set of separator layers are cellulose-based layers. In one embodiment, the cellulose-based layers are cellulose impregnated with polyvinyl alcohol (PVA).

Figure 2I:
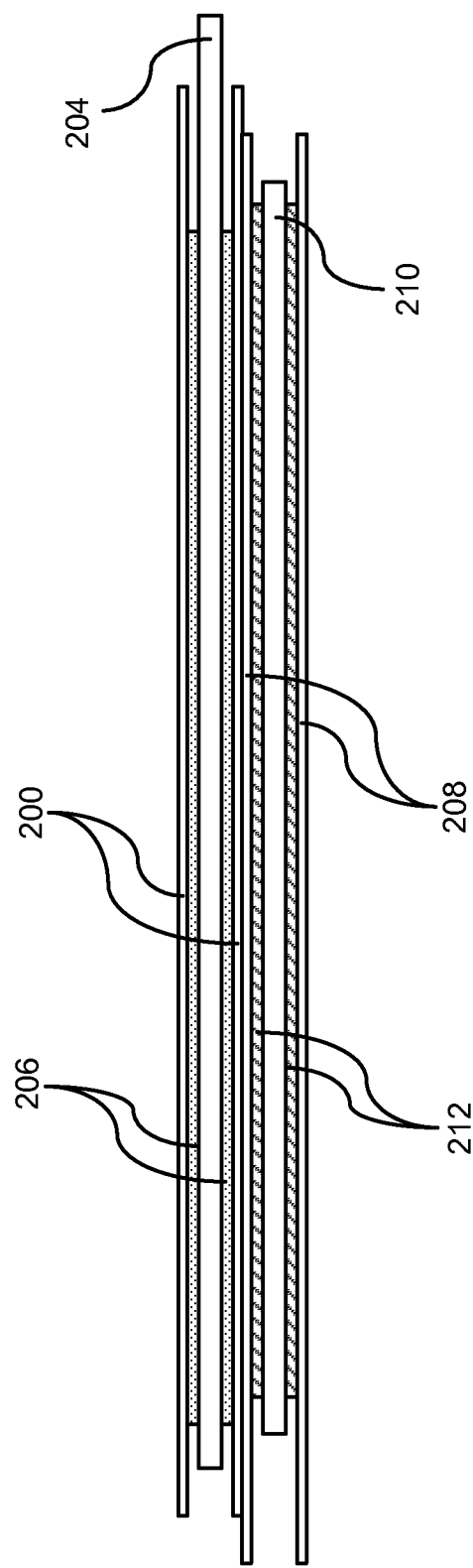
FIG. 2I is a cross section of an electrode-separator stack.

FIG. 2I shows another stack assembly, like that in FIG. 2B, except the separator materials and electrodes are laterally offset differently than in FIG. 2B. Here, positive substrate 210 does not protrude past the separator materials, while negative substrate 204 does so. This stack is an example of one used for a normal polarity battery.

Figure 2J:
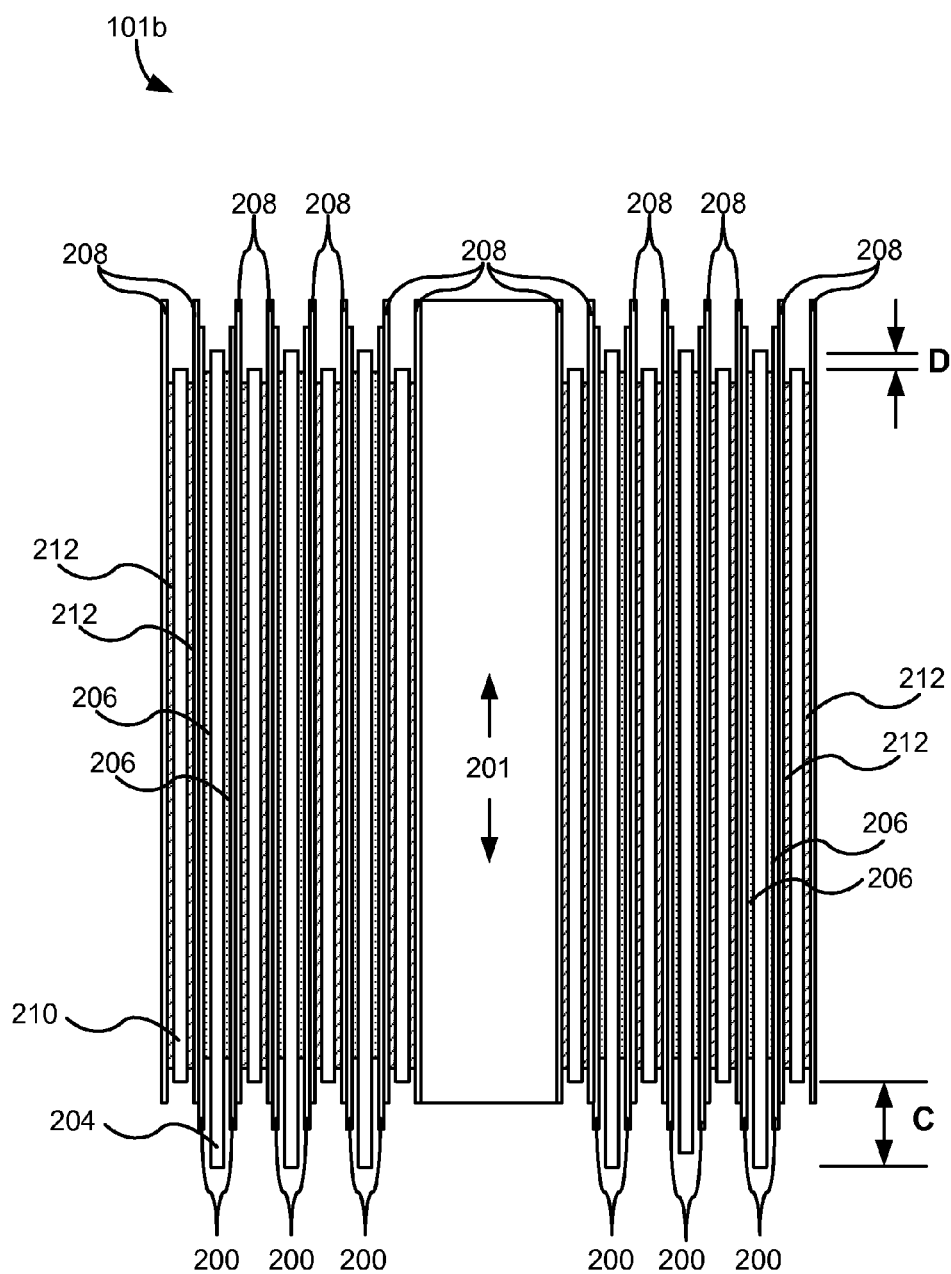
FIG. 2J is a cross section of a jellyroll assembly.
Figure 2K:
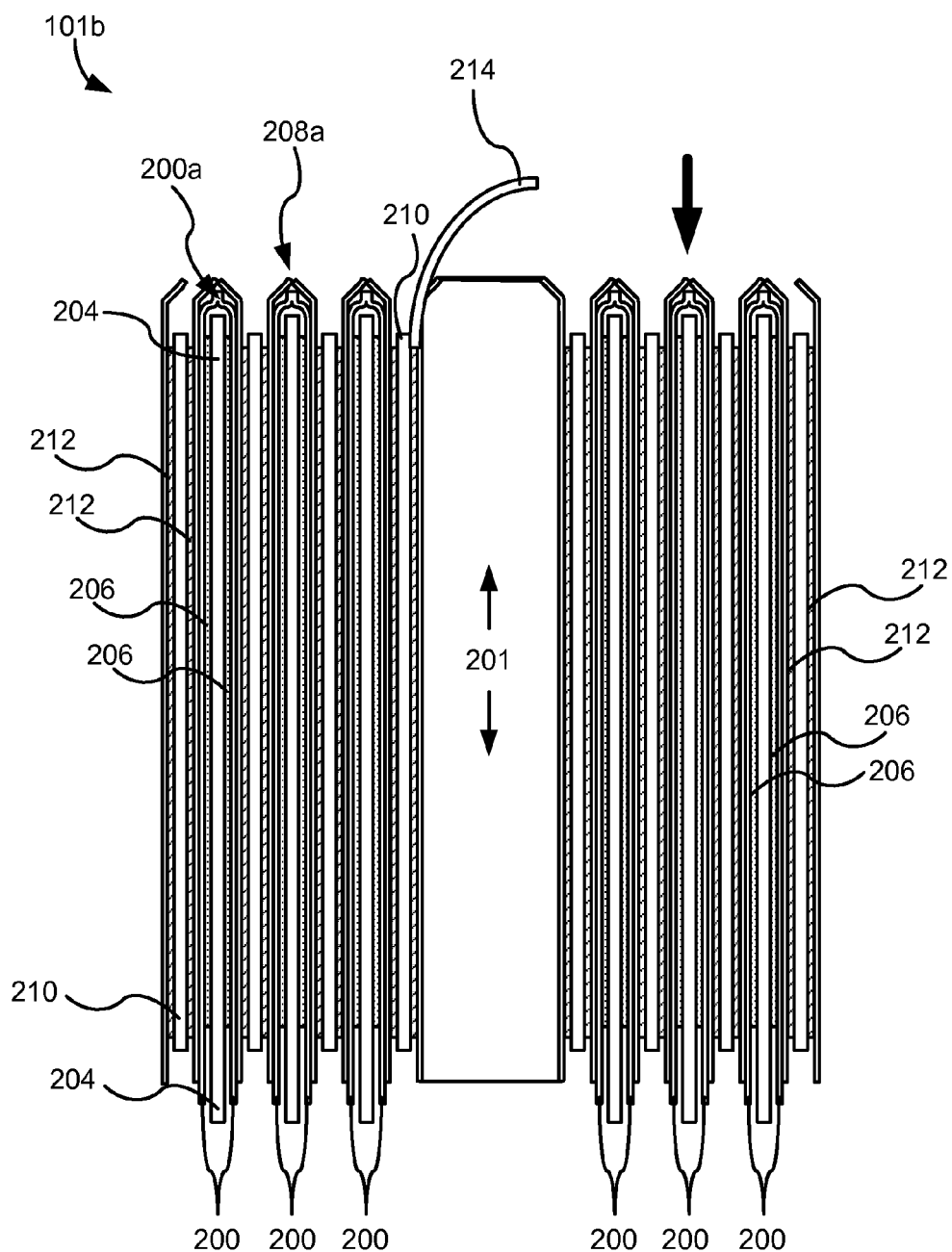
FIG. 2K is a cross section of the jellyroll assembly of FIG. 2J after heat sealing at one end of the jellyroll.

FIG. 2J is a cross-section (cut B as shown in FIG. 1A) of a jellyroll 101b, similar to jellyroll 101 as depicted in FIG. 1A, and specifically where the jellyroll is made by winding the stack structure as described in FIG. 2I. In this example the reference numbers are the same as those used in reference to separators, electrodes, and electrochemically active materials. At the bottom of the jellyroll the relative distance, C, between the ends of the electrodes is the same as those at the top of the jellyroll in the previous embodiment. However, in this example, the relative distance, D, between the ends of the electrodes at the top of the jellyroll is not as great as that in the previous embodiment. This configuration is desirable to employ selective sealing at one or both ends of the jellyroll (infra). Here separators 200 and 208 are staggered at the bottom of the jellyroll consistent with those at the top of jellyroll 101a of the previous embodiment, but the separators at the top of the jellyroll are staggered consistent with those at the bottom of jellyroll 101a of the previous embodiment. In one example, selective sealing of one of the electrodes at the top (as depicted) of jellyroll 101b is depicted in FIG. 2K.

Since separator layers 200 are polypropylene layers and separator layers 208 are cellulose-based layers, when heat is applied to the top of jellyroll 101b sufficient to melt and seal polypropylene separator layers 200, while separator layers 208 are not sealed. Thus, the negative electrode is sealed, while the positive electrode is not sealed. In most embodiments, because heat is applied quickly, it is substantially localized to the end of the jellyroll where applied, and thus heat damage (for example melting shut separator pore structure) to the separator proximate to the electrochemically active material is minimized. FIG. 2K shows the result of applying heat (to the top of jellyroll 101b as indicated by the heavy downward arrow) sufficient to seal, e.g., a polypropylene separator layer 200 while the cellulose-based layer 208 is not sealed. Analogous to the relative relation described with respect heat sealed jellyroll 101a, separator layers 200 are melted and fused at point 200a while separator layers 208 are not melted and fused, as indicated at 208a.

In one embodiment employing jellyroll 101b, a tab, 214, is welded to positive current collector substrate 210 near the top of jellyroll 101b. Tab 214 can be welded to the positive substrate before or after heat treatment. In one embodiment tab 214 is attached prior to heat sealing. In this embodiment, tab 214 is folded over, substantially parallel to the end of the jellyroll, during heat sealing so that the entire end of the jellyroll is heated. In this embodiment, heat is transferred to the separator materials under folded over tab 214 via the folded over portion of tab 214. After heat sealing, tab 214 is unfolded, as depicted in FIG. 2K, so that it can be welded to the battery cap or current collector.

Figure 2L:
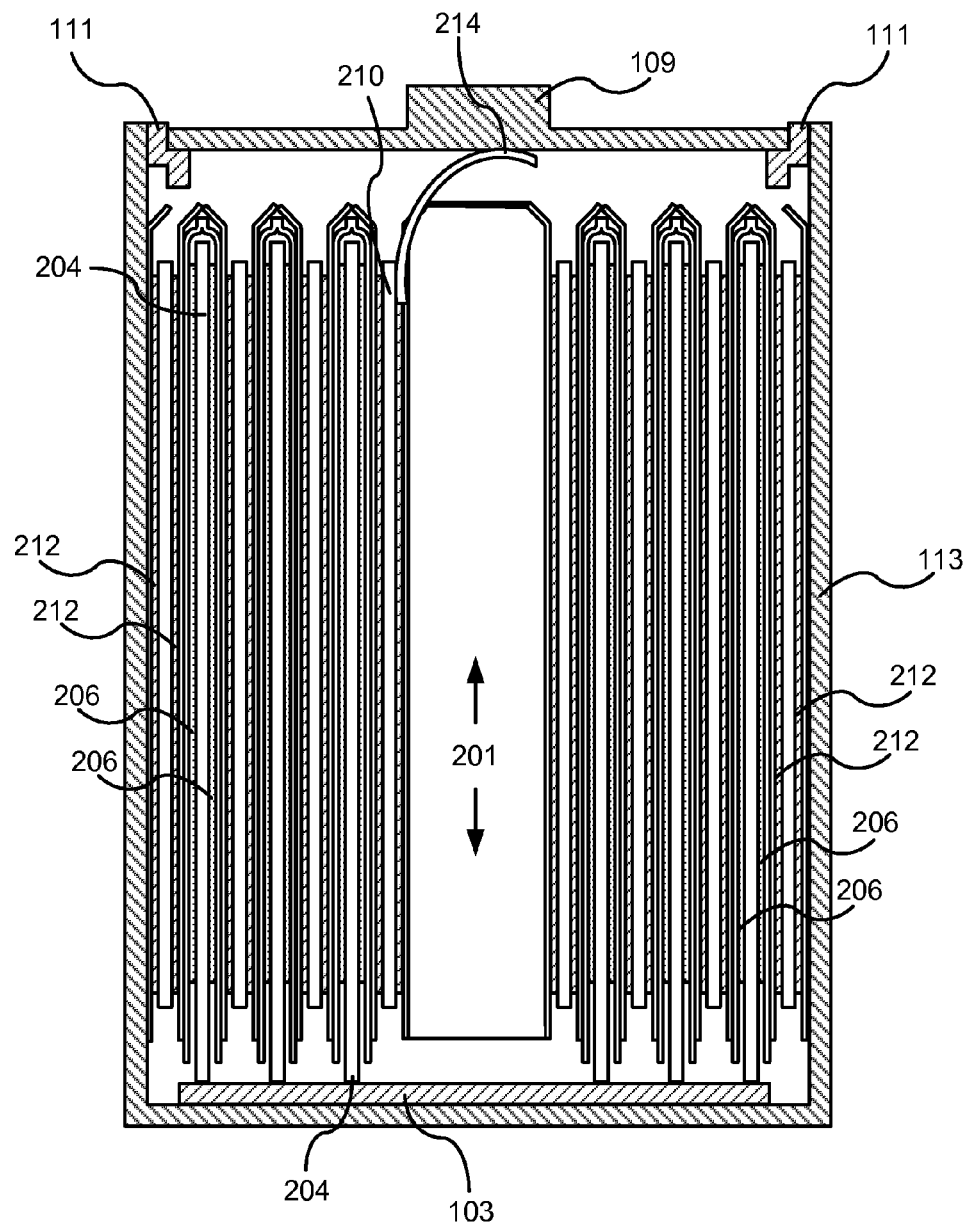
FIG. 2L is a cross section of the jellyroll assembly of FIG. 2K incorporated into a normal polarity battery.

FIG. 2L depicts jellyroll 101b incorporated into a normal polarity battery. Here, tab 214 is welded to cap 109, e.g. the vented cap as described above. This configuration allows the electrode assemblies in jellyroll 101b to be longer, saving space without a current collector disk and providing for more electrochemically active material in the battery. In an alternative embodiment, tab 214 is in electrical communication with, either welded to or e.g. under spring contact pressure, with positive current collector disk 105 (not shown). Can 113 and gasket 111 are analogous to those described in relation to FIGS. 1A and 1B. Negative current collecting substrate 204 is in electrical communication with negative current collector 103 now at the bottom of can 113. In this example, cap 109 is positive.

Figure 2M:
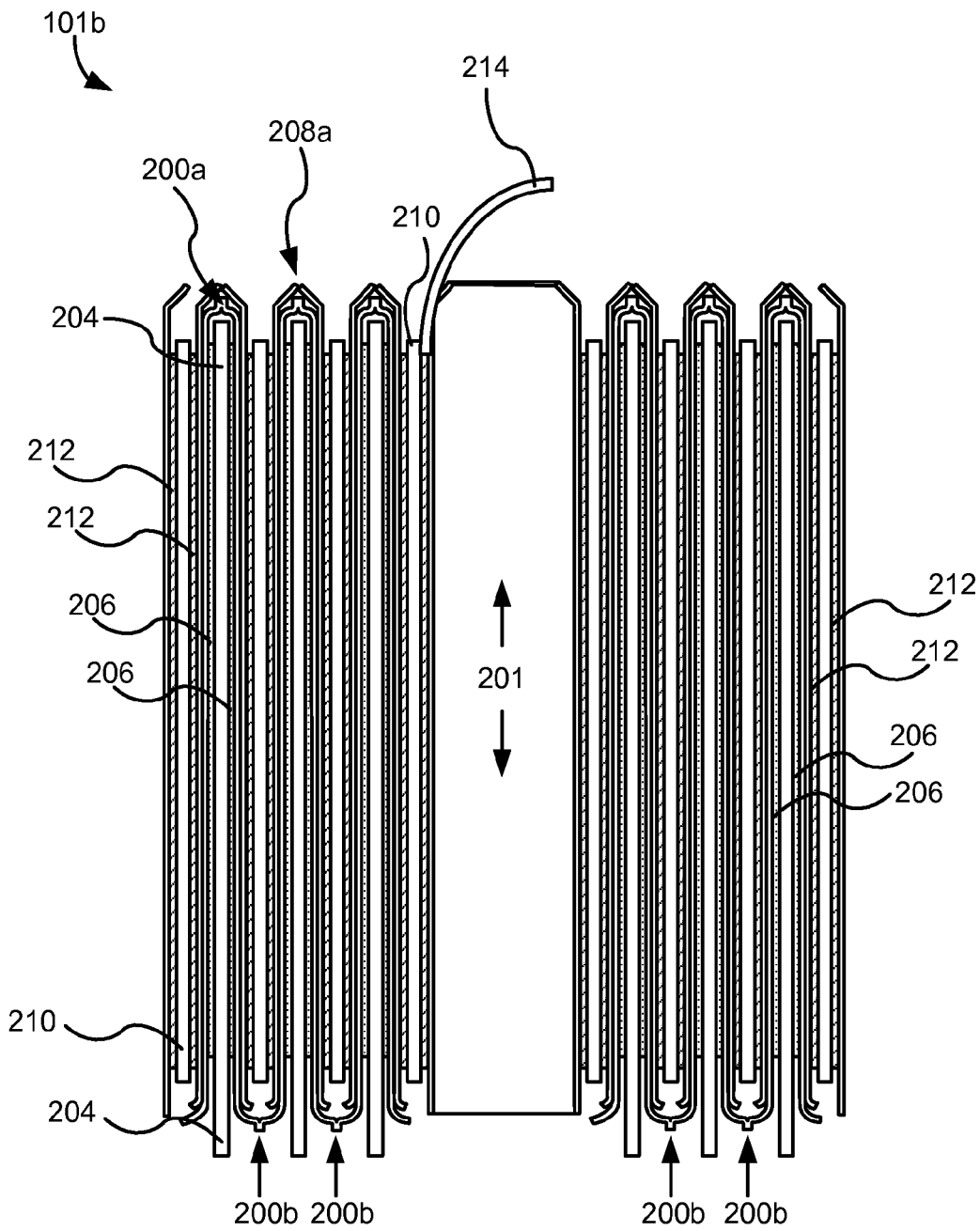
FIG. 2M is a cross section of the jellyroll assembly as described in relation to FIG. 2K after the opposite end of the jellyroll is subjected to selective heat sealing.
Figure 2N:
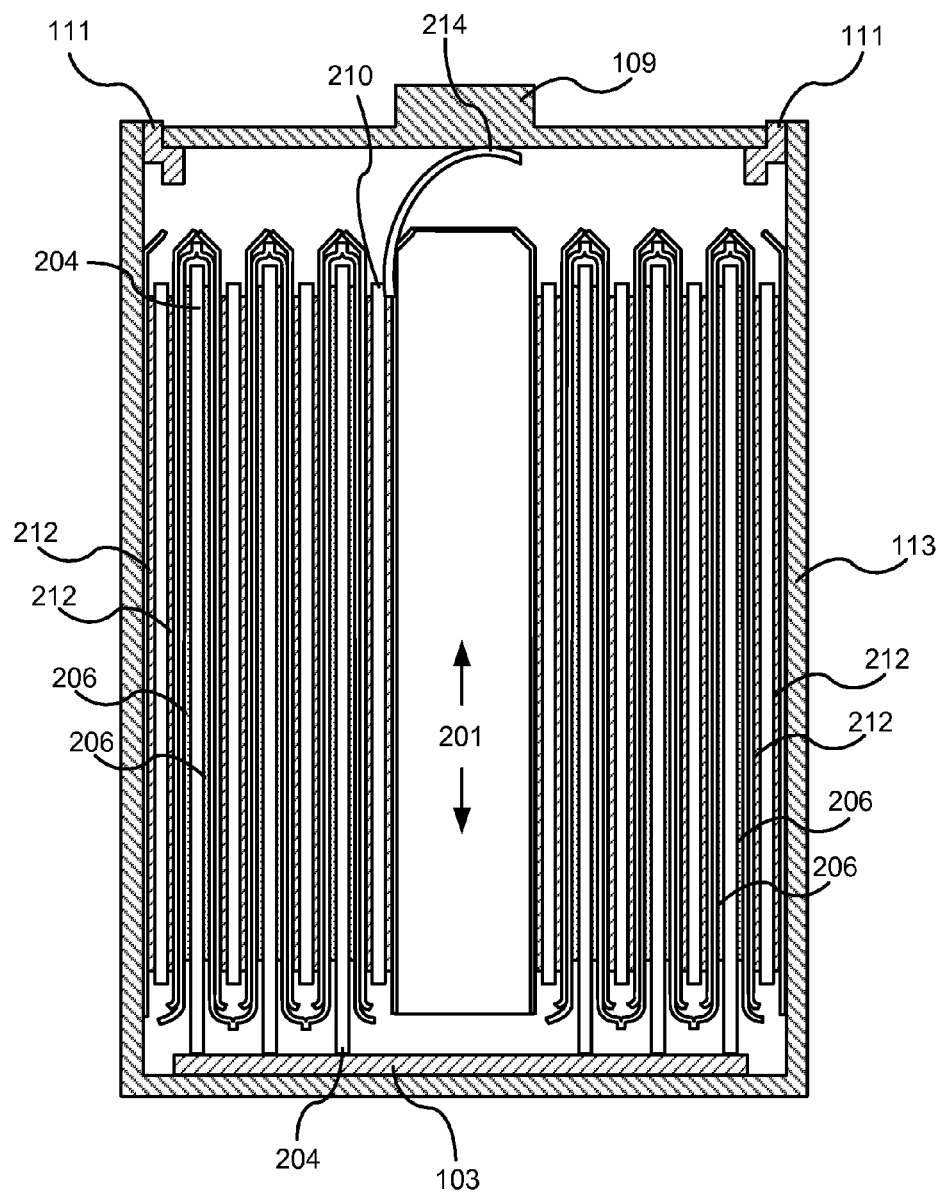
FIG. 2N is a cross section of the jellyroll assembly of FIG. 2M incorporated into a normal polarity battery.

FIG. 2M depicts a cross section of jellyroll 101b, as depicted in FIG. 2K, where heat has been applied to the bottom (as depicted) of the jellyroll. Here, both ends of the jellyroll have been subjected to selective sealing. The top (as depicted) is sealed as described in relation to FIG. 2K. At the bottom of the jellyroll, selective sealing is achieved by virtue of the arrangement of the separators and the electrodes at this end of the jellyroll. When heat is appropriately applied, for example pressing the top of the jellyroll onto a hot platen as described herein, layers of separator 200 are fused at points 200b, in between neighboring layers of the negative substrate 204. Separator layers 208 do not fuse (supra) but are encapsulated by fusions 200b, at least in internal layers of the jellyroll. On the outermost layer and innermost layer, separator 200 is melted, but being the outermost and innermost layers, each has no complimentary layer of separator 200 to make a corresponding fusion 200b. Fusion of the interior layers of 200 at this end of the jellyroll encapsulates the positive electrode, analogous to the jellyroll and process described in relation to FIG. 2F-G. FIG. 2N depicts the jellyroll of FIG. 2M incorporated into a normal polarity battery, where the components are analogous to those described in relation to FIG. 2L, for example positive cap 109, negative current collector 103, etc.

In each of the embodiments above, the heat source used to seal separators includes at least one of a convective heat source, an inductive heat source, a conductive heat source and a radiative heat source. In one embodiment the heat source is a conductive heat source. In another embodiment the conductive heat source is a heated platen. In some embodiments, although e.g. about 5 seconds may be sufficient to seal a polypropylene separator, if there are additional layers and/or layers that may insulate (e.g. cellulose-based layers) more time may be needed to transfer sufficient heat to the ends of the separators to seal them. In one embodiment, the end of the jellyroll that is heated, where the first electrode is selectively enveloped via sealing the first set of separators, is contacted with the heated platen for between about 1 second and about 30 seconds, where the platen temperature is between about 130° C. and 600° C. In another embodiment, the jellyroll is contacted with the heated platen for between about 3 seconds and about 10 seconds, where the platen temperature is between about 300° C. and 600° C. In yet another embodiment, the jellyroll is contacted with the heated platen for between about 5 seconds and about 25 seconds, where the platen temperature is between about 450° C. and 550° C.

In some embodiments, during contact with the heated platen, the jellyroll is contacted with the heated platen with a force of between about 0.5 kg/cm$^2$ and 5 kg/cm$^2$. In other embodiments, the jellyroll is contacted with the heated platen with a force of between about 1 kg/cm$^2$ and 3 kg/cm$^2$. In still other embodiments, the jellyroll is contacted with the heated platen with a force of between about 1 kg/cm$^2$ and about 2 kg/cm$^2$. In still other embodiments, the jellyroll is contacted with the heated platen with a force of about 1.5 kg/cm$^2$. In some embodiments, for example those described in relation to jellyrolls 101a and 101b, this force is used to aid heating of the end of the jellyroll where selective heat sealing takes place. In embodiments were folded substrates are employed, applied force may also serve to flatten the folds of the conductive substrate for more uniform heating.

As mentioned, methods described herein can be practiced with any jellyroll configured electrode assembly, and is particularly useful for nickel zinc cells where dendrite formation from the zinc electrode can short the electrodes.

Thus, given the detailed description of various embodiments, another aspect of the invention is a jellyroll electrode assembly including: i) a first electrode disposed between a first set of separator layers; and ii) a second electrode disposed between a second set of separator layers; where, at the same end of the jellyroll electrode assembly, one of the first electrode and the second electrode is enveloped by its respective set of separator layers and the other electrode is not enveloped by its set of separator layers. Either the nickel positive or the zinc negative electrode can be the one selectively sealed. In one embodiment, the first electrode is a zinc electrode and the second electrode is a nickel electrode. In another embodiment, the first set of separator layers includes polypropylene layers. In another embodiment, the second set of separator layers includes polyvinyl alcohol impregnated cellulose. Batteries which include the jellyroll electrode assemblies described herein are another aspect of the invention, batteries of normal and reverse polarity as described above.

EXPERIMENTAL

Figure 3:
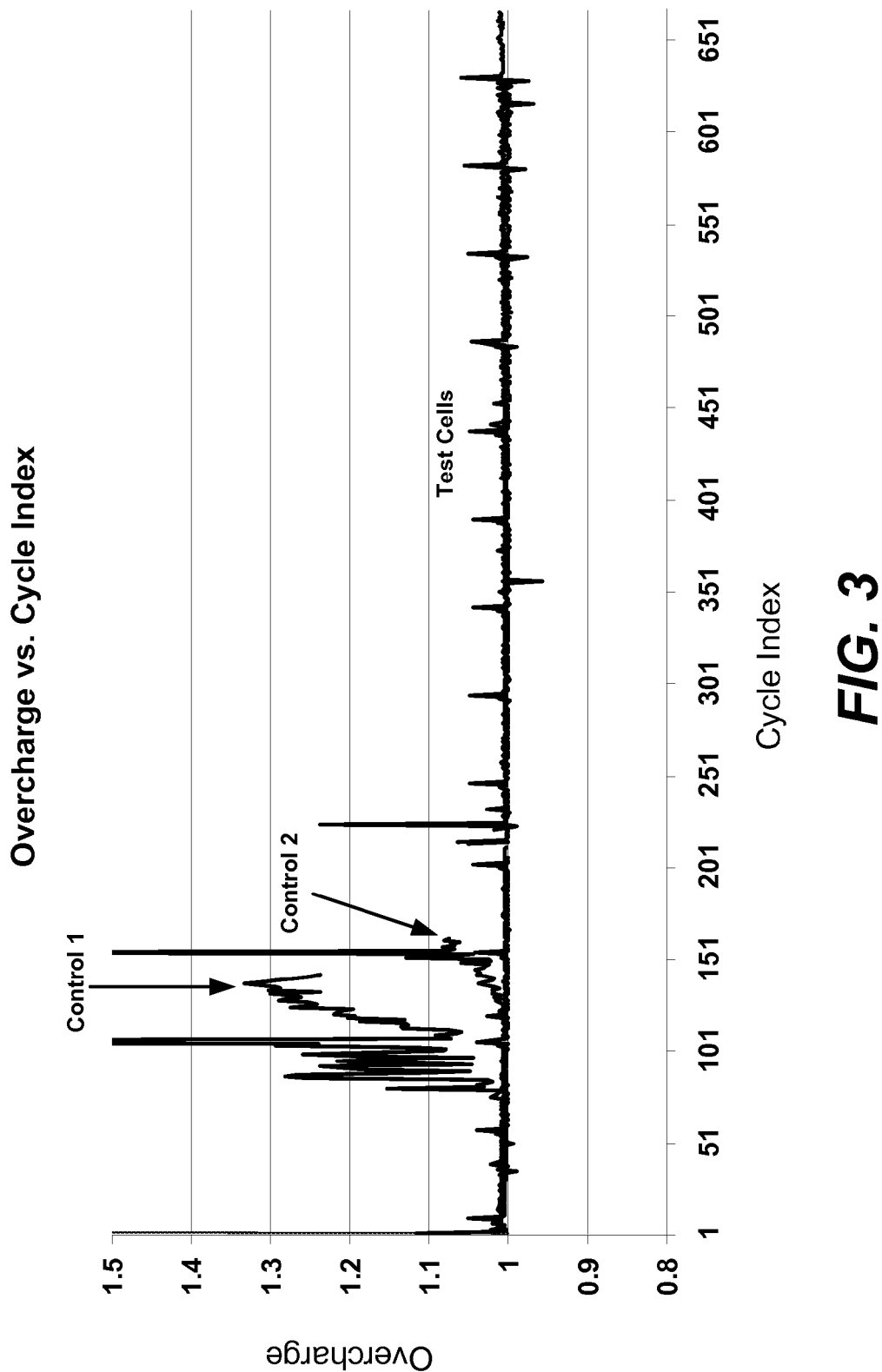
FIG. 3 is a graph showing comparative results for nickel zinc batteries manufactured using the heat sealing methods described herein and for those not employing the heat sealing methods.

FIG. 3 shows test results of cells incorporating heat-sealed separators in accord with embodiments described in relation to jellyroll 101a, where positive current collector substrate 210 was folded over after the jellyroll was wound and then the end of the jellyroll was exposed to a hot plate within the times, temperature ranges and applied forces described above in (3) Test cells vs. a set of (2) Control cells where no heat sealing was performed. The cells were tested under a rate of 5 C discharge. These curves indicate when the cell has gone into an overcharge condition, e.g., up to or greater than 105% overcharge (on the Y-axis, 0.9=90%, 1=100%, 1.1=110%, etc.). When the curves have a steady rise, this indicates a short within the cell. Control cells lasted from 100 to 250 cycles before shorting as indicated by the rising curves. Heat sealing as described herein allows the 3 test cells to operate past 500 and up to 650 cycles before any general degradation of the cell occurs (all three curves substantially overlap). Since the implementation of heat-sealing in over 100 cells, no cells have failed from a negative migration short.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A method of selectively melting and fusing together a first set of separator layers disposed on both sides of a first electrode and extending past an edge of electrochemically active material in the first electrode of a jellyroll assembly comprising two electrodes, while not fusing together a second set of separator layers disposed on both sides of a second electrode, and extending past an edge of electrochemically active material in the second electrode, wherein both edges are parallel and proximate to each other and are disposed on the same end of the jellyroll assembly, while exposing said same end of the jellyroll assembly to a heat source, wherein the heat source generates heat to selectively melt and fuse together the first set of separator layers.

2. The method of claim 1, wherein selectively melting and fusing together the first set of separator layers comprises:
    i) configuring the current collecting substrate of the second electrode so that when the heat source is applied to said same end of the jellyroll assembly, the first set of separator layers can melt and fuse together to envelop the first electrode, but the second set of separator layers are physically obstructed from fusing together and enveloping the second electrode; and
    ii) applying the heat source to said same end of the jellyroll assembly.

3. The method of claim 2, wherein configuring the current collecting substrate of the second electrode comprises folding the current collecting substrate of the second electrode substantially over, but not touching, the current collecting substrate of the first electrode, so that a substantially enclosed volume is formed, wherein the first set of separator layers and adjoining separator layers from the second set of separator layers are disposed in the substantially enclosed volume.

4. The method of claim 1, wherein selectively melting and fusing together the first set of separator layers comprises:
    i) configuring the jellyroll assembly such that the first set of separator layers comprises layers that can melt and fuse together to envelop the first electrode when the heat source is applied, but the second set of separator layers comprises layers that can not fuse together to envelop the second electrode when the heat source is applied; and
    ii) applying the heat source to said same end of the jellyroll assembly.

5. The method of claim 1, wherein the first set of separator layers and the second set of separator layers each have different melting points.

6. The method of claim 1, wherein the first set of separator layers are polypropylene layers and the second set of separator layers are cellulose-based layers.

7. The method of claim 6, wherein the second set of separator layers are cellulose impregnated with polyvinyl alcohol.

8. The method of claim 7, wherein the heat source comprises at least one of a convective heat source, an inductive heat source, a conductive heat source and a radiative heat source.

9. The method of claim 8, wherein the heat source is a conductive heat source.

10. The method of claim 9, wherein the conductive heat source is a heated platen.

11. The method of claim 10, wherein said same end of the jellyroll is contacted with the heated platen for between about 3 seconds and about 10 seconds, wherein the platen temperature is between about 300° C. and 600° C.

12. The method of claim 11, wherein the jellyroll is contacted with the heated platen with a force of between about 0.5 kg/cm2 and about 5 kg/cm2.

13. The method of claim 1, wherein the first electrode is a zinc electrode and the second electrode is a nickel electrode.

* * * * *